United States Patent
Numakami

(10) Patent No.: US 10,110,642 B2
(45) Date of Patent: Oct. 23, 2018

(54) COMMUNICATION APPARATUS, COMMUNICATION SYSTEM, COMMUNICATION METHOD, AND STORAGE MEDIUM

(71) Applicant: CANON KABUSHIKI KAISHA, Tokyo (JP)

(72) Inventor: Yukio Numakami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 190 days.

(21) Appl. No.: 15/142,602

(22) Filed: Apr. 29, 2016

(65) Prior Publication Data

US 2016/0330095 A1 Nov. 10, 2016

(30) Foreign Application Priority Data

May 8, 2015 (JP) ................................. 2015-095654

(51) Int. Cl.
*G06F 15/16* (2006.01)
*H04L 29/06* (2006.01)
*H04L 29/08* (2006.01)

(52) U.S. Cl.
CPC .......... *H04L 65/1069* (2013.01); *H04L 67/02* (2013.01); *H04L 67/141* (2013.01)

(58) Field of Classification Search
CPC . H04L 43/0823; H04L 67/02; H04L 65/1069; H04L 67/141
See application file for complete search history.

(56) References Cited

U.S. PATENT DOCUMENTS

| 2010/0318668 | A1* | 12/2010 | Sylvain | H04L 67/24 709/228 |
| 2012/0110194 | A1* | 5/2012 | Kikkawa | H04L 69/14 709/227 |
| 2016/0057801 | A1* | 2/2016 | Xia | H04W 76/027 370/221 |

FOREIGN PATENT DOCUMENTS

JP 2012-095098 A 5/2012

* cited by examiner

*Primary Examiner* — June Y Sison
*Assistant Examiner* — Steven C Nguyen
(74) *Attorney, Agent, or Firm* — Canon U.S.A., Inc. IP Division

(57) ABSTRACT

An communication apparatus includes a communication unit configured to establish a connection with another communication apparatus and generate one or a plurality of streams based on the connection, a determination unit configured to determine not to newly establish a stream based on the connection established with the another communication apparatus, and an adding unit configured to add to a message that is to be transmitted to the another communication apparatus in accordance with the determination made by the determination unit a communication parameter usable for reestablishing a communication path with the another communication apparatus.

12 Claims, 16 Drawing Sheets

COMMUNICATION APPARATUS, COMMUNICATION SYSTEM, COMMUNICATION METHOD, AND STORAGE MEDIUM

BACKGROUND OF THE INVENTION

1. Field of the Invention

The present invention relates to a communication apparatus, a communication system, a communication method, and a storage medium.

2. Description of the Related Art

General widely used Internet standard techniques include protocols such as Hyper Text Transfer Protocol (HTTP) and User Datagram Protocol (UDP). In some protocols, such as HTTP/2 as a new version of HTTP for which the specification is currently being defined, processing for upgrading the version of the currently used protocol is executed at the time communications start. This upgrade is achieved with a communication parameter, defined in the specification of the protocol, exchanged between communication apparatuses so that a communication parameter, required for the communications using the protocol, is set in the communication apparatuses.

In this context, a method of establishing a plurality of Transmission Control Protocol (TCP) connections, and performing a plurality of HTTP communications in parallel achieve communications at higher speed has been proposed as discussed in Japanese Patent Application Laid-Open No. 2012-95098.

However, a configuration discussed in Japanese Patent Application Laid-Open No. 2012-95098 has a problem in that reestablishment of a communication path requires the upgrade processing for a protocol used for communications, and thus requires a long period of time for reestablishment the communication path. For example, there arises a problem that the reestablishment of a communication path requires a long period of time occurs when a communication error occurs after a connection is established as communication path for HTTP/2 and reestablishment of the connection starts from the protocol upgrade processing.

When the communication parameter is, exchanged in the protocol upgrade processing, first communication apparatus might transmit, to a second communication apparatus, a communication parameter of an incorrect value that does not conform to the specification of the protocol, or a communication parameter of a value unacceptable by the second communication apparatus. In this case, the second communication apparatus needs to transmit a signal, indicating that communications need to be terminated due to the occurrence of the connection error, to the first communication apparatus, and then terminate the communication using the upgraded protocol. Unfortunately, this procedure has a problem of low connectivity between the communication apparatuses due to a failure to start normal communications, with the first communication apparatus transmitting the communication parameter of an incorrect value an unacceptable value again in an attempt reestablish the connection and start the communications using the upgraded protocol.

SUMMARY OF THE INVENTION

According to an aspect of the present invention, an communication apparatus includes a communication unit configured to establish a connection, serving as a communication path, with another communication apparatus, generate one a plurality of streams serving as communication paths based on the connection thus established, and communicate with the another communication apparatus using the stream thus generated, a determination unit configured to determine not newly establish a stream based on the connection established with the another communication apparatus, an adding unit configured to add to a message that is transmitted to the another communication apparatus in accordance with the determination made by the determination unit and is used for notifying the another communication apparatus that no stream is newly established based on the connection established with the another communication apparatus, a communication parameter usable for reestablishing the communication path with the another communication apparatus, and a control unit configured to control the communication unit so that the message, including information on the communication parameter added by the adding unit, is transmitted to the another communication apparatus by the communication unit.

Further features of the present invention will become apparent from the following description of exemplary embodiments with reference to the attached drawings.

DESCRIPTION OF THE EMBODIMENTS

Exemplary embodiments of the present invention are described below with reference to the drawings.

(System Configuration)

Figure 1:
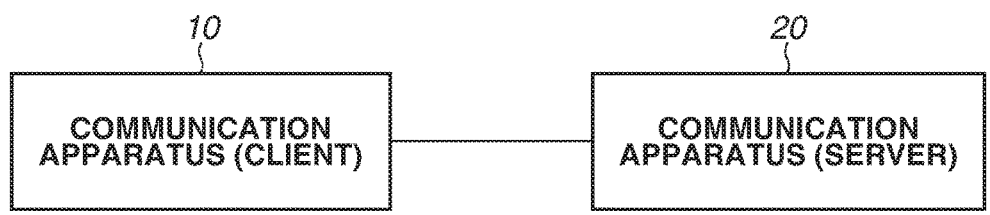
FIG. 1 is a diagram illustrating an example of a system configuration of a communication system.

A first exemplary embodiment is described. FIG. 1 is a diagram illustrating an example of a system configuration of a communication system. A communication apparatus 10 is a communication apparatus serving as a client in the present exemplary embodiment, and has a wireless local area network (LAN) communication function conforming to IEEE 802.11 and the like. The communication apparatus 10 is a digital camera, a digital video camera, a mobile phone, a smartphone, or the like. The communication apparatus 10 may also be an information processing apparatus such as a personal computer (PC), a laptop PC, or a server.

In the present exemplary embodiment, the communication apparatus 10 uses the wireless LAN communication function communicate with another apparatus. Alternatively, the communication apparatus 10 may use other wireless LAN communication functions such as Bluetooth (registered trademark), ZigBee (registered trademark), and radio frequency identifier (RFID), to communicate with another apparatus. Furthermore, the communication apparatus 10 may use a wired LAN communication function such as Ethernet (registered trademark) or a combination of the wireless LAN communication and the wired LAN communication function, to communicate with another apparatus.

A communication apparatus 20 is a communication apparatus serving as a server in the present exemplary embodiment, and is connected to the communication apparatus 10 through a wireless LAN. In the present exemplary embodiment, the communication apparatuses 10 and 20 perform HTTP communications conforming to an HTTP/2 specification. The communication apparatuses 10 and 20 may perform communications using any other protocol in which protocol upgrade is performed at the time when the communications start, and a signal indicating termination of the communications is transmitted from the communication apparatus 10 or 20 to the communication partner when a connection error occurs.

The communication apparatus 20 is directly connected to the communication apparatus 10 through a wireless LAN in the present exemplary embodiment, and may be alternatively connected to the communication apparatus 10 via a wireless access point. Furthermore, the communication apparatus 20 may be in wired LAN connection with the communication apparatus 10 via a relay apparatus such as a network switch or a router.

In the present exemplary embodiment, the communication apparatuses 10 and 20 are connected to each other through the same LAN. Alternatively, the communication apparatuses 10 and 20 may be connected to each other through a wide area network (WAN), the Internet, a public wireless line for mobile phones, or the like.

Figure 2:
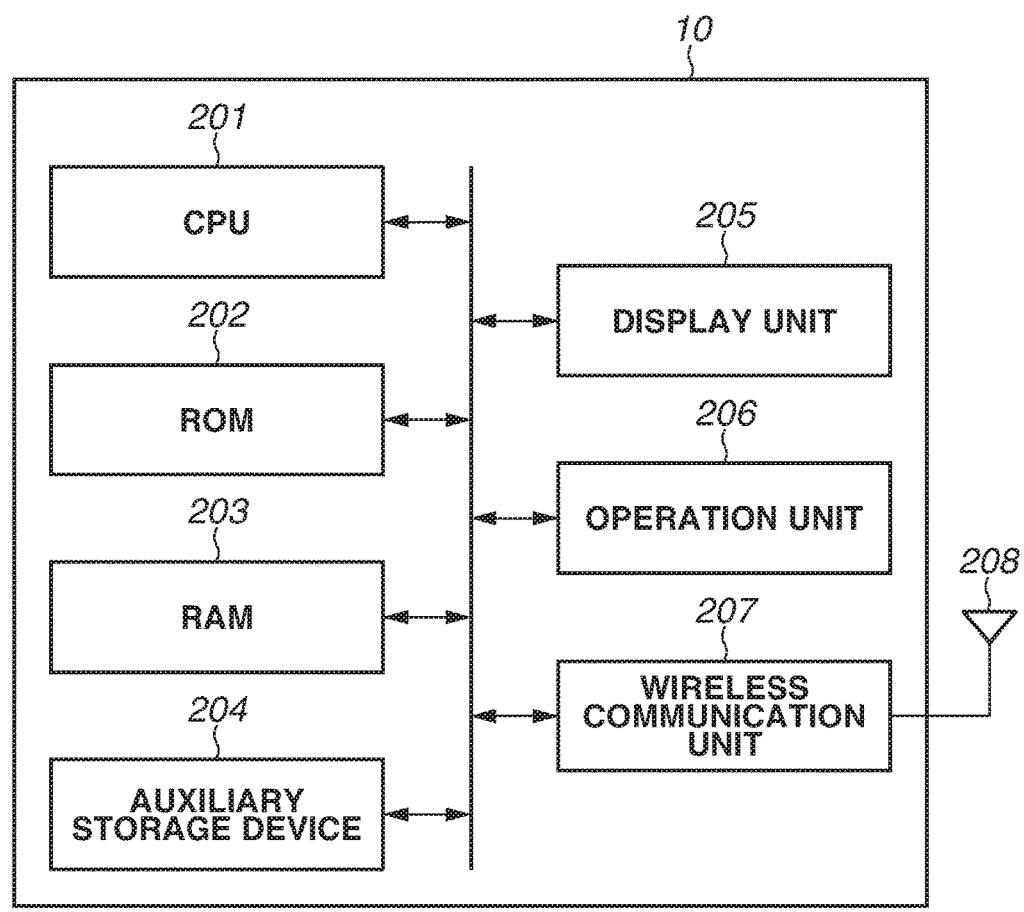
FIG. 2 is a diagram illustrating an example of a hardware configuration of a communication apparatus.

FIG. 2 is a diagram illustrating an example of a hardware configuration of the communication apparatus 10. The communication apparatus 20 has the same hardware configuration as the communication apparatus 10. The communication apparatus 10 includes a central processing unit (CPU) 201, a read only memory (ROM) 202, a random access memory (RAM) 203, an auxiliary storage device 204, a display unit 205, an operation unit 206, and a wireless communication unit 207. An antenna 208 is connected to the wireless communication unit 207.

The CPU 201 controls operations of the communication apparatus 10 as a whole. The ROM 202 stores a program, a parameter, and the like that do not need to be changed. The RAM 203 stores a program and data supplied from the auxiliary storage device 204 and the like, and also functions as a work area for the CPU 201. The auxiliary storage device 204 stores data such as an image content, video content, various setting files, and various set thresholds.

The display unit 205 displays a graphical user interface (GUI) used by a user to operate the communication apparatus 10. The operation unit 206 is an input interface used by the user to operate the communication apparatus 10. The wireless communication unit 207 controls the antenna 208, and performs wireless LAN communications with a wireless access point or the communication apparatus 20.

The CPU 201 executes processing based on the program stored in the ROM 202 or the auxiliary storage device 204, so that functions of the communication apparatus 10 described below as well as processing in sequence diagrams and flowcharts described below are implemented.

A CPU of the communication apparatus 20 executes processing based on a program stored in a ROM or an auxiliary storage device of the communication apparatus 20, so that functions of communication apparatus 20 described below as well as processing in sequence diagrams and flowcharts described below are implemented.

(Functional Configuration)

Figure 3:
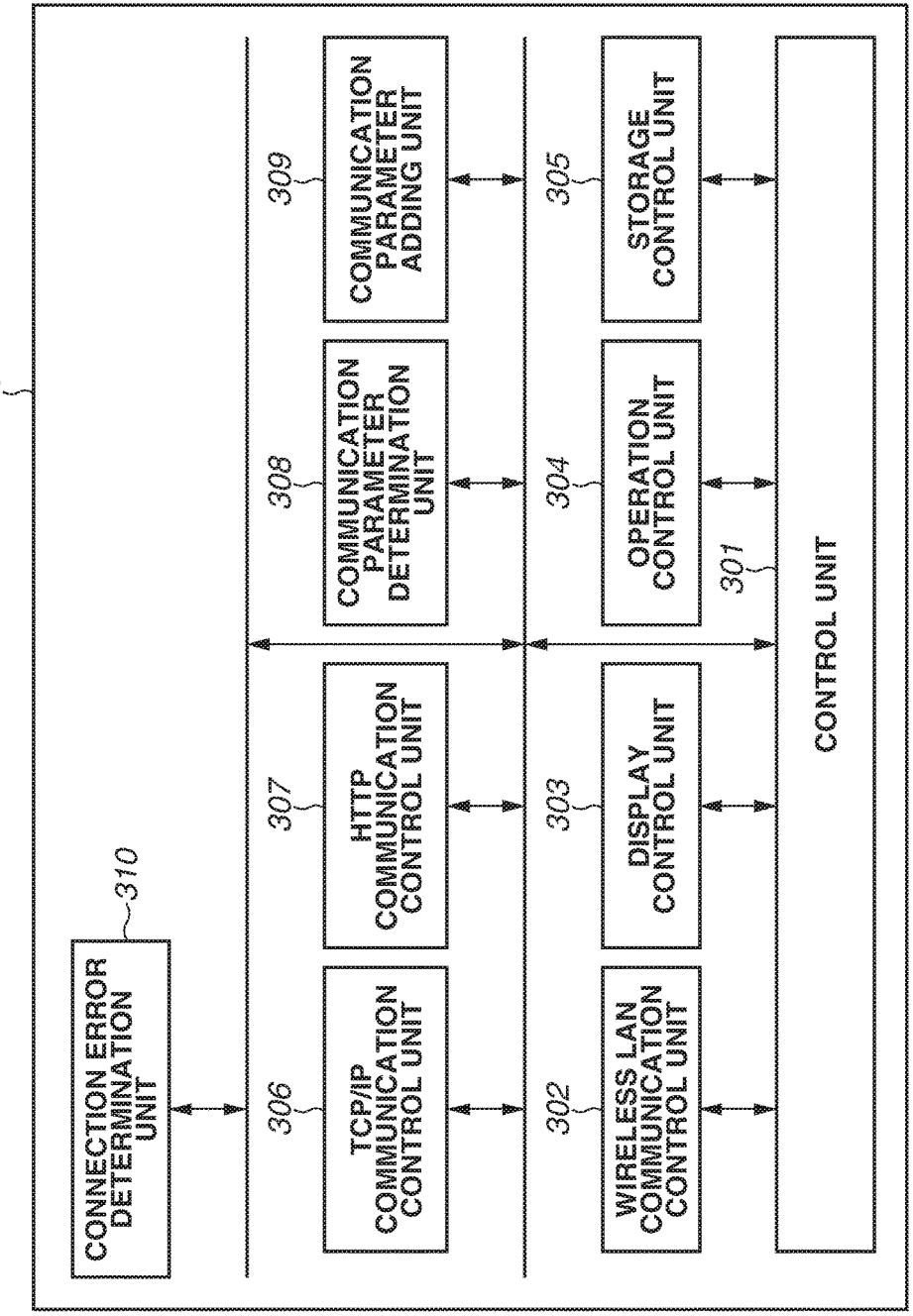
FIG. 3 is a diagram illustrating a functional configuration of a communication apparatus.

FIG. 3 is a diagram illustrating an example of a functional configuration of the communication apparatus 20.

The communication apparatus 20 includes a control unit 301, a wireless LAN communication control unit 302, a display control unit 303, an operation control unit 304, a storage control unit 305, a Transmission Control Protocol/Internet Protocol (TCP/IP) communication control unit an HTTP communication control unit 307, a communication parameter determination unit 308, a communication parameter adding unit 309, and a connection error determination unit 310.

The control unit 301 controls various functions of the communication apparatus 20 as a whole. The wireless LAN communication control unit 302 controls a communication unit of the communication apparatus 20, and controls communications with the wireless access point or the communication apparatus 10 based on a wireless LAN communication scheme. The display control unit 303 controls a display unit of the communication apparatus 20, and performs GUI display control. The operation control unit 304 controls an operation unit of the communication apparatus 20, and controls an operational input from the user through the operation unit of the communication apparatus 20. The storage control unit 305 controls a RAM of the communication apparatus 20 or the auxiliary storage device of the communication apparatus 20, and stores or deletes data such as processing data, an image content, and a video content.

The TCP/IP communication control unit 306 performs communications, based on a TCP/IP scheme, with the communication apparatus 10 through the wireless LAN communication control unit 302. Processing of establishing a connection for the TCP/IP communications an example of processing of establishing a connection serving as a communication path between the communication apparatuses 10 and 20. The communication apparatuses 10 and 20 communicate with each other by using TCP/IP in the present exemplary embodiment, but may also communicate with each other by using UDP or the like.

The HTTP communication control unit 307 performs communications based on the HTTP/2 scheme with the communication apparatus 10 through the TCP/IP communication control unit 306. The HTTP communication control unit 307 may perform communications based on HTTP Secure (HTTPS) communications, using transport layer security (TLS), with the communication apparatus 10.

The communication parameter determination unit 308 determines whether a communication parameter required for establishing an HTTP communication connection with the communication apparatus 10, is to be added to a GOAWAY frame to be transmitted to the communication apparatus 10, via the HTTP communication control unit 307.

A case is described as an example where a value of a communication parameter, in a SETTINGS frame transmitted from the communication apparatus 10, is an incorrect value (hereinafter, referred to as an incorrect parameter value) that does not conform to the specification of HTTP/2 or a value (hereinafter, referred to as an unacceptable parameter value) that is unacceptable by the communication apparatus 20. In this case, the communication parameter determination unit 308 determines that the communication parameter, required for establishing the HTTP communication connection with the communication apparatus 10, is to be added to the GOAWAY frame. Upon determining that the communication parameter is to be added, the communication parameter determination unit 308 determines the content of the communication parameter to be added.

The communication parameter adding unit 309 adds the communication parameter determined by the communication parameter determination unit 308, to the GOAWAY frame, via the HTTP communication control unit 307 and the communication parameter determination unit 308.

The connection error determination unit 310 determines the cause of a connection error detected in the HTTP communications with the communication apparatus 10, and determines a communication parameter to be added to the GOAWAY frame in accordance with the content of the cause thus detected, via the HTTP communication control unit 307. The connection error is one example of a communication error.

Figure 4:
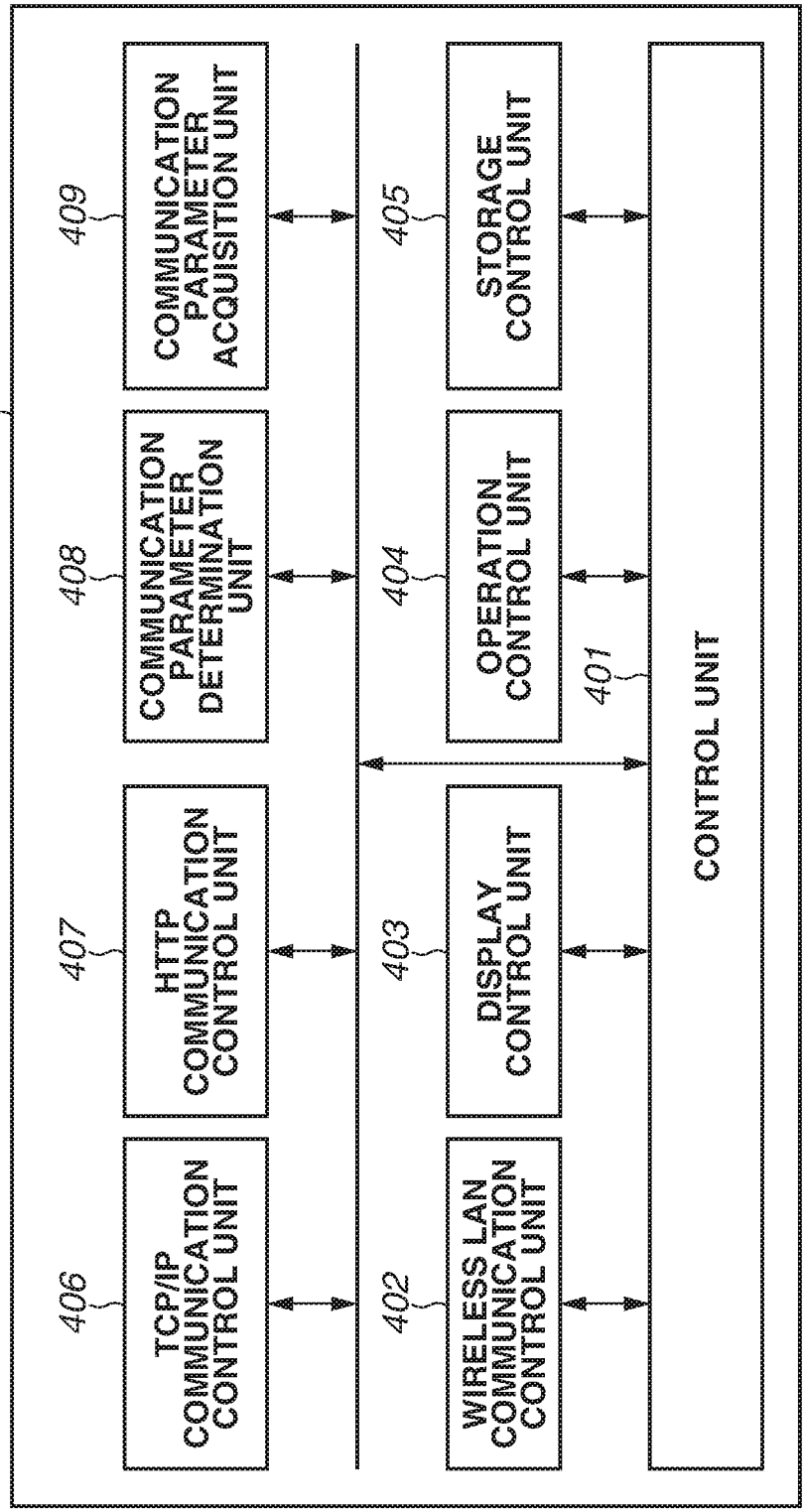
FIG. 4 is a diagram illustrating an example of a functional configuration of the communication apparatus.

FIG. 4 is a diagram illustrating an example of a functional configuration of the communication apparatus 10. Functional configuration elements 401 to 407 respectively are the same as the functional configuration elements 301 to 307.

A communication parameter determination unit 408 determines a communication parameter required for establishing the HTTP communication connection with the communication apparatus 20, via an HTTP communication control unit 407 and a communication parameter acquisition unit 409.

The communication parameter acquisition unit 409 acquires the communication parameter in the GOAWAY frame received from the communication apparatus 20, via the HTTP communication control unit 407.

(GOAWAY Frame Data Structure)

Figure 5:
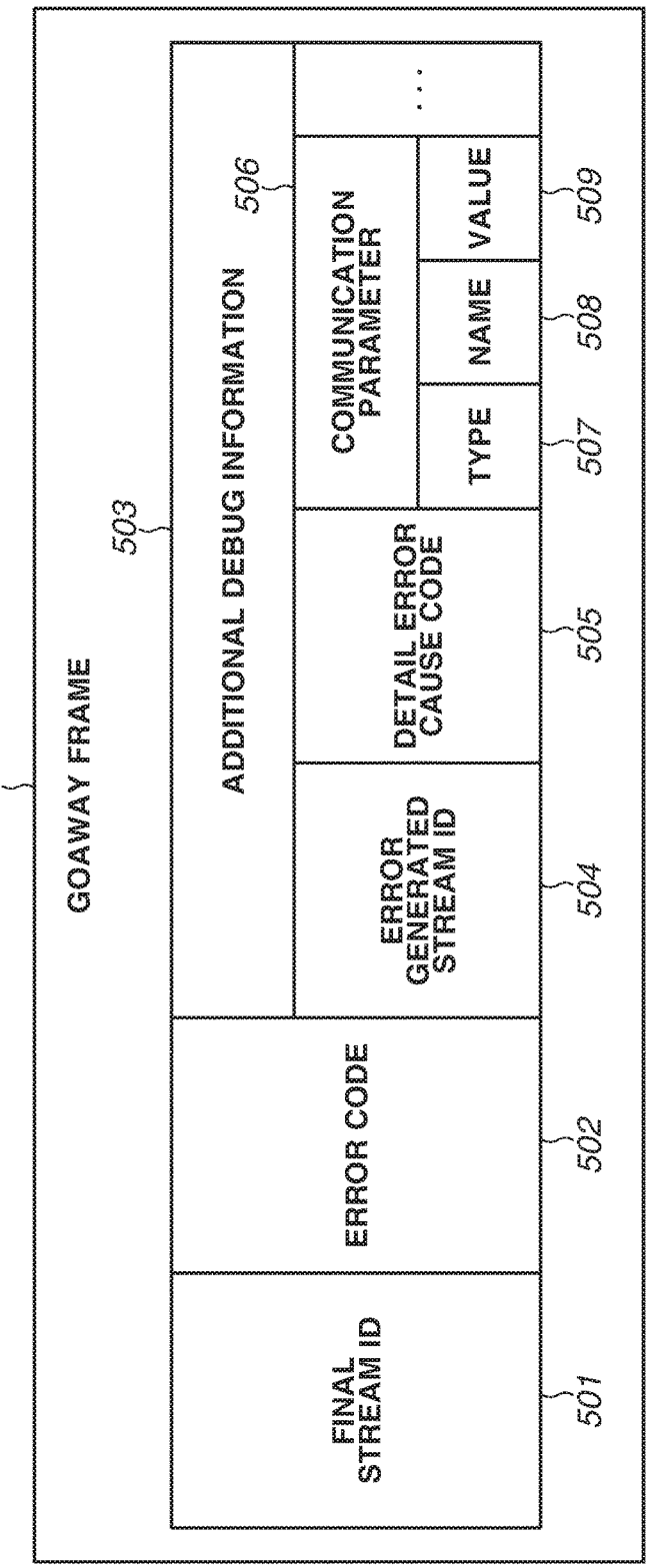
FIG. 5 is a diagram illustrating an example of a data structure of a GOAWAY frame.

FIG. 5 is a diagram illustrating an example of a data structure of the GOAWAY frame serving as a message for notifying a communication partner that no new stream is to be generated. In the present exemplary embodiment, the GOAWAY frame is used as an end message instructing the termination of the communications. The stream is a logical communication path on a connection, such as a connection for the TCP communications, established between the communication apparatuses. The communication apparatuses 10 and 20 communicate with each other by generating a stream on the connection, such as the connection for the TCP communications established therebetween, and transmitting and receiving messages to and from each other on the stream.

A GOAWAY frame 500 represents the entire data of the GOAWAY frame.

A final stream identification (ID) 501 represents an ID of a final stream used in the HTTP communications between the communication apparatuses 10 and 20.

An error code 502 us information indicating the cause of a generated connection error.

Additional debug information 503 is information that is added to the GOAWAY frame and does not conform to the specification of the HTTP/2 protocol. In the present exemplary embodiment, the additional debug information 503 includes an error generated stream ID 504, a detail error cause code 505, and a communication parameter 506. In the present exemplary embodiment, the communication parameter adding unit 309 adds a communication parameter to the additional debug information 503.

The error generated stream ID 504 is an ID related to a stream corresponding to the cause of the generated connection error.

The detail error cause code 505 is information indicating a detail cause of the generated connection error. It is assumed that the detail error cause code 505 has more detailed contents than the error code 502.

The communication parameter 506 is communication parameter required for the communication apparatus 10 to reestablish the connection for the HTTP communications with the communication apparatus 20. The communication parameter 506 includes a type 507 of the communications, a name 508 of the communication parameter 506, and a value 509 of the communication parameter 506.

(Communication Processing)

Communication processing between the communication apparatuses 10 and 20 according to the present exemplary embodiment is described below in detail.

(Processing of Establishing, Releasing, and Reestablishing Connection for Communication)

Figure 6:
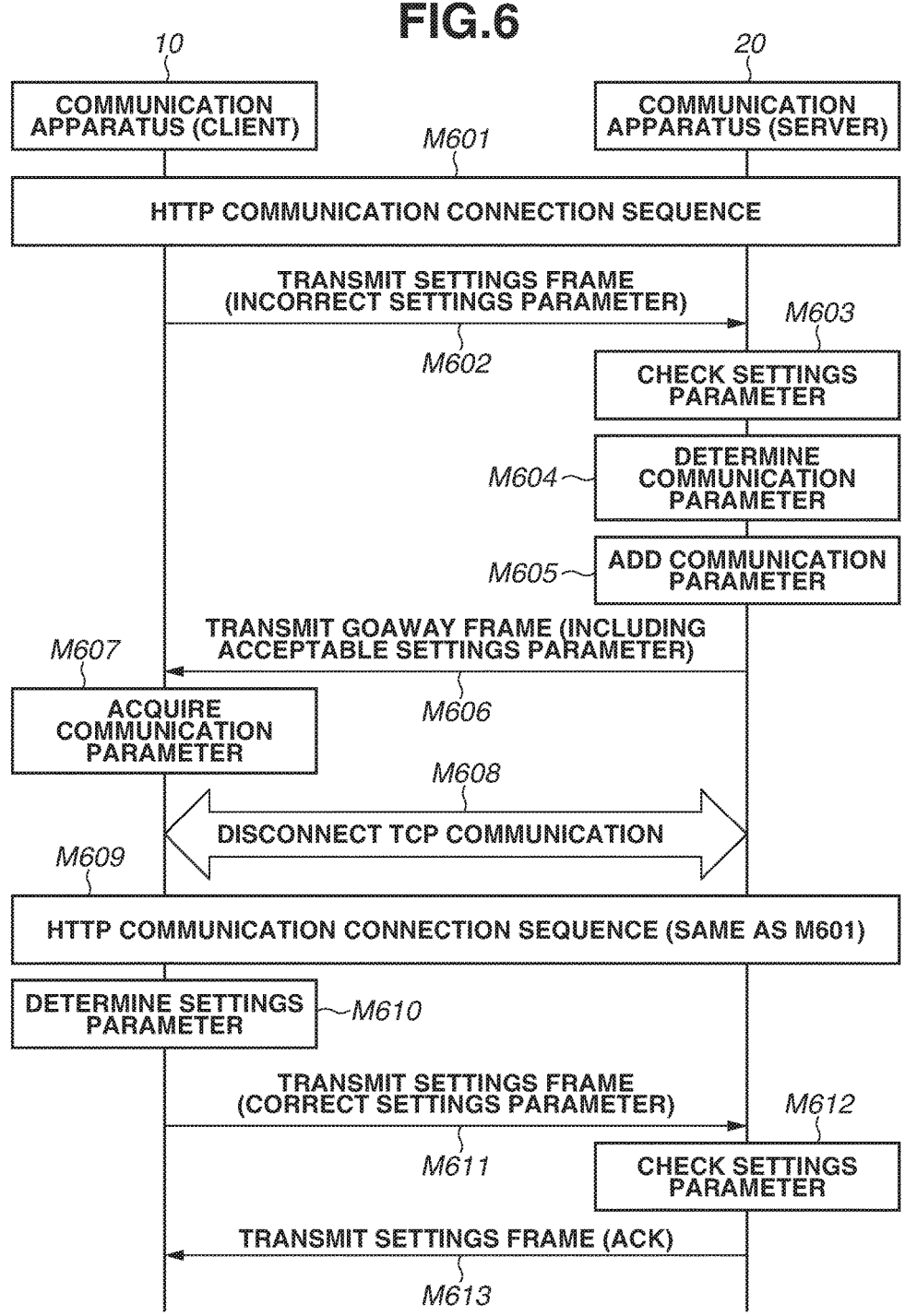
FIG. 6 is a sequence diagram illustrating an example of Hyper Text Transfer Protocol (HTTP) communication processing between the communication apparatuses.

FIG. 6 is a sequence diagram illustrating an example of HTTP communication processing between the communication apparatuses 10 and 20.

In M601, the HTTP communication control unit 407 establishes an HTTP communication connection with the communication apparatus 20. The processing in M601 is described in detail below with reference to FIG. 7.

In M602, the HTTP communication control unit 407 transmits a SETTINGS frame to the communication apparatus 20. It is assumed here that the HTTP communication control unit 407 transmits an incorrect parameter value or an unacceptable parameter value as a SETTINGS parameter of the SETTINGS frame. The SETTINGS parameter is an example of the communication parameter.

The SETTINGS parameter includes SETTINGS_MAX_CONCURRENT_STREAMS indicating the maximum number of concurrent streams acceptable by the transmitter, SETTINGS_INITIAL_WINDOW_SIZE indicating an initial window side of the transmitter, and SETTINGS_MAX_HEADER_LIST_SIZE indicating the maximum size of a header list. The SETTINGS parameter may also be another SETTINGS parameter defined in the HTTP/2 specification, a unique SETTINGS parameter that is not defined in the HTTP/2 specification, and the like.

In M603, the HTTP communication control unit 307 receives the SETTINGS frame from the communication apparatus 10, and checks the SETTINGS parameter. The HTTP communication control unit 307 generates the connection error when the SETTINGS parameter is the incorrect parameter value or the unacceptable parameter value.

In M604, the communication parameter determination unit 308 specifies the cause of the connection error generated by the HTTP communication control unit 307. The communication parameter determination unit 308 determines a SETTINGS parameter conforming to the HTTP/2 specification or a SETTINGS parameter acceptable parameter the communication apparatus 20, leading to no connection error, based on the cause thus specified. That is, the communication parameter determination unit 308 determines at least one of the acceptable communication parameter usable to reestablish the communication path and the communication parameter conforming to the specification, as the communication parameter usable to reestablish the communication path with the communication apparatus 10.

In M605, the communication parameter adding unit 309 adds the value of the SETTINGS parameter determined in M604, as the communication parameter 506 in the additional debug information to the GOAWAY frame to be transmitted to the communication apparatus 10.

In M606, the HTTP communication control unit 307 transmits the GOAWAY frame including the communication parameter added in M605, to the communication apparatus 10.

In M607, the communication parameter acquisition unit 409 receives the GOAWAY frame received from the communication apparatus 20 via the HTTP communication control unit 407, and acquires the communication parameter 506 in the additional debug information 503 in the GOAWAY frame thus received.

In M608, the HTTP communication control unit 307 and the HTTP communication control unit 407 terminate the HTTP communications. More specifically, the HTTP communication control unit 307 and the HTTP communication control unit 407 release the TCP connection.

Processing in M609 is the same as the processing in M601.

In M610, the communication parameter determination unit 408 determines the SETTINGS parameter based on the communication parameter in the GOAWAY frame received when the previous HTTP communication connection is released. The determined SETTINGS parameter is a value conforming to the HTTP/2 specification or a value acceptable by the communication apparatus 20, received from the communication apparatus 20.

In M611, the HTTP communication control unit 407 transmits a SETTINGS frame (second message) including the SETTINGS parameter determined in M610, to the communication apparatus 20.

In M612, the HTTP communication control unit 307 receives the SETTINGS frame from the communication apparatus 10, and determines whether the value of the SETTINGS parameter in the received SETTINGS frame is correct.

Upon determining that the value of the SETTINGS parameter in the SETTINGS frame received in M612, is correct, the HTTP communication control unit 307 executes the following processing in M613. More specifically, the HTTP communication control unit 307 transmits to the communication apparatus 10, a SETTINGS frame in which an ACK flag, indicating that it has been determined that the value of the SETTINGS parameter received in M612 is correct, is set.

(HTTP Communication Connection Sequence)

Figure 7:
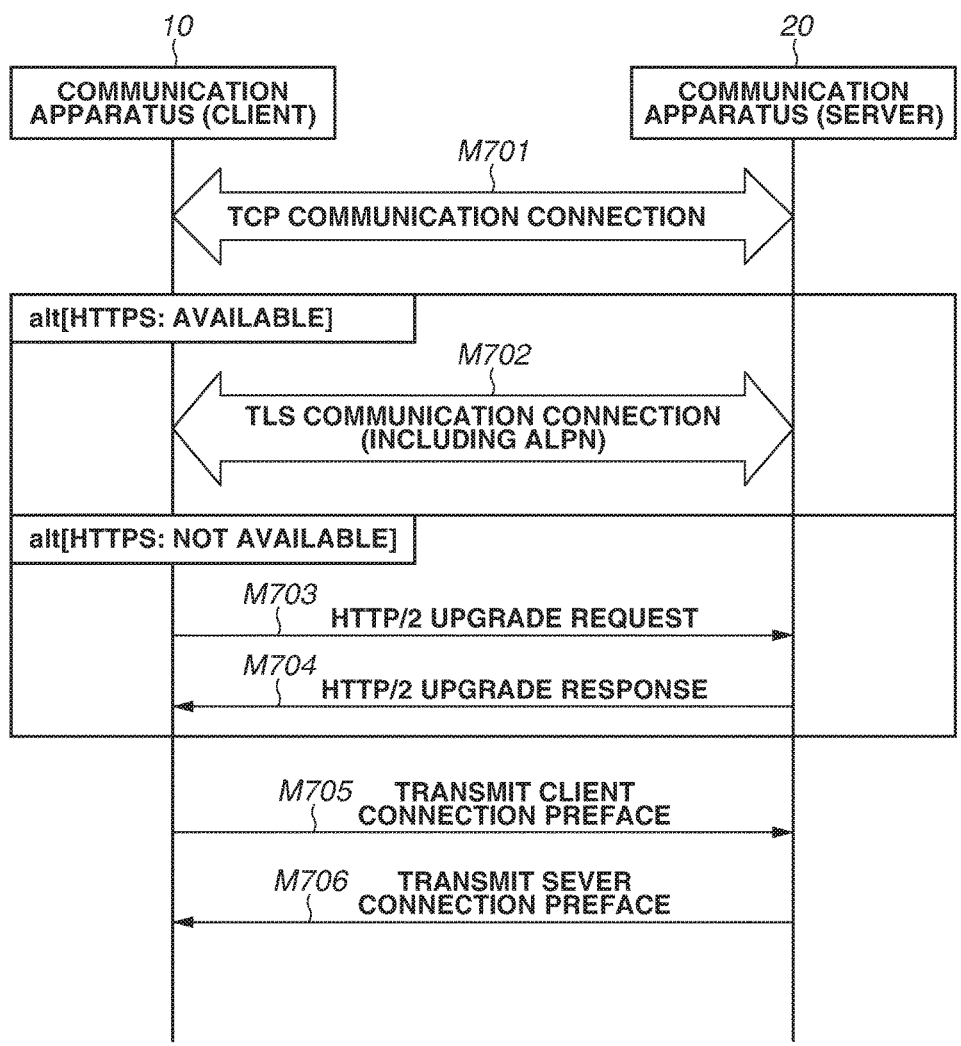
FIG. 7 is a sequence diagram illustrating an example of HTTP communication processing between the communication apparatuses.

FIG. 7 is a sequence diagram illustrating an example of HTTP communication processing between the communication apparatuses 10 and 20. FIG. 7 illustrates processing representing details of the processing in M601 and M609.

In M701, the TCP/IP communication control unit 406 establishes the TCP communication connection with the communication apparatus 20.

In M702, the HTTP communication control unit 407 establishes the TLS communication with the communication apparatus 20 when the HTTPS communications are performed. The HTTP communication control unit 407 performs negotiations for the HTTP/2 communications with Application Layer Protocol Negotiation (ALPN), while there is the TLS communication connection.

In M703, the HTTP communication control unit 407 transmits an HTTP/2 upgrade request to the communication apparatus 20 when the HTTPS communications are not performed.

In M704, the HTTP communication control unit 307 transmits an HTTP/2 upgrade response to the communication apparatus 10, for the HTTP/2 upgrade request transmitted in M703. After the processing in M704, the communication apparatuses 10 and 20 start the HTTP/2 communications.

In M705, the HTTP communication control unit 407 transmits a client connection preface, including a Primary Rate Interface (PRI) method and a SETTINGS frame, to the communication apparatus 20.

In M706, the HTTP communication control unit 307 transmits a sever connection preface to the communication apparatus 10. The sever connection preface includes only a SETTINGS frame that might be empty.

(Communication Processing)

The communication processing between the communication apparatuses 10 and 20 according to the present exemplary embodiment is described in detail with reference to the functional module configurations illustrated in FIGS. 3 and 4.

(Processing Executed when GOAWAY Frame is Transmitted)

Figure 8:
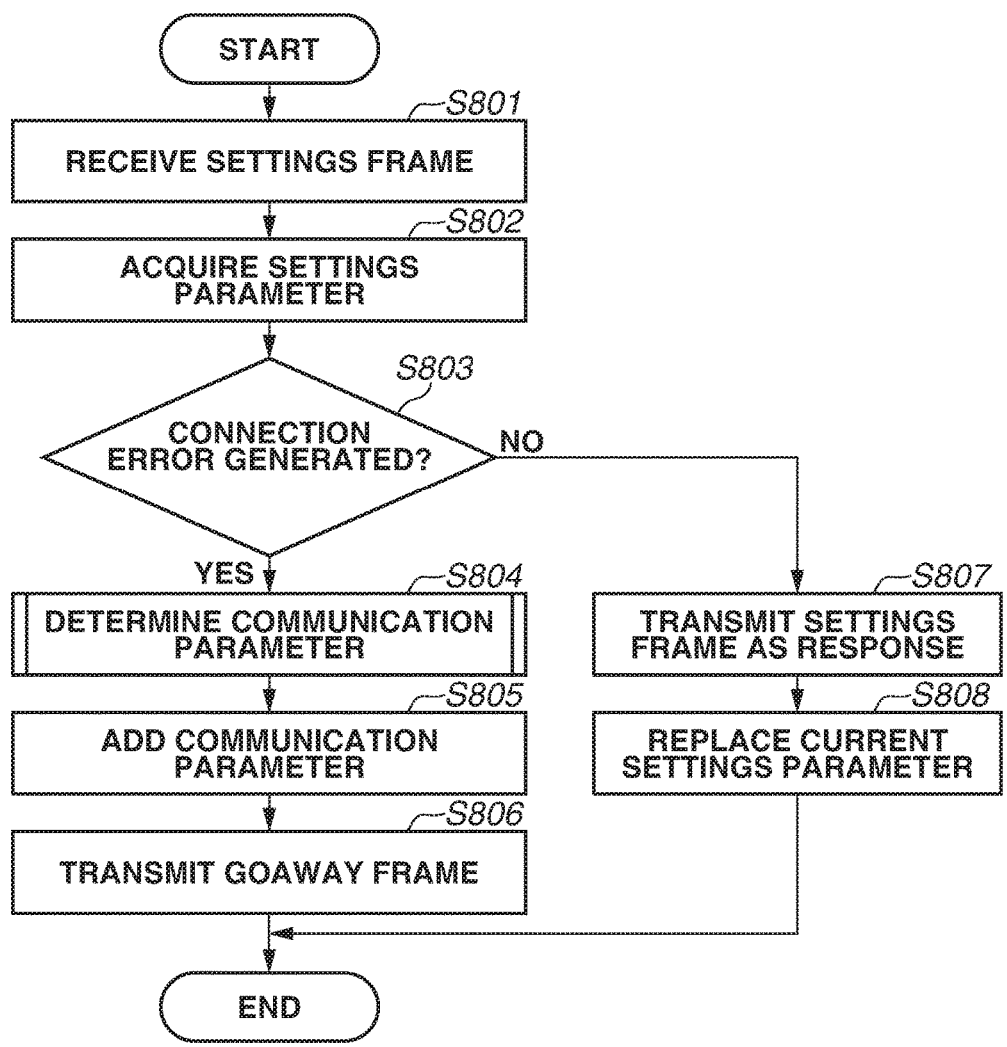
FIG. 8 is a flowchart illustrating an example of processing executed when a GOAWAY frame is transmitted.

FIG. 8 is a flowchart illustrating an example of processing executed by the communication apparatus 20 when the GOAWAY frame is transmitted. The communication apparatus 10 can also transmit the GOAWAY frame.

In step S801, the HTTP communication control unit 307 receives a SETTINGS frame from the communication apparatus 10, via the TCP/IP communication control unit 306.

In step S802, the HTTP communication control unit 307 acquires a SETTINGS parameter from the SETTINGS frame received in step S801.

In step S803, the HTTP communication control unit 307 determines whether the connection error is to be generated based on the SETTINGS frame received in step S801. Here, it is assumed that information (values such as a frame size, a padding length, and a SETTINGS parameter) on a correct SETTINGS frame is stored, as a setting file or the like, in the auxiliary storage device or the like of the communication apparatus 20 in advance.

For example, the HTTP communication control unit 307 reads out the information on the correct SETTINGS frame from the setting file stored in the auxiliary storage device of the communication apparatus 20, and executes the following processing. More specifically, the HTTP communication control unit 307 determines whether values of the frame size, the padding length, and the SETTINGS parameter in the received SETTINGS frame are correct, based on the information thus read out. Upon determining that the values of the frame size, the padding length, and the SETTINGS parameter in the received SETTINGS frame are incorrect, the HTTP communication control unit 307 determines that the connection error is to be generated.

When the HTTP communication control unit 307 determines that the connection error is to be generated (Yes in step S803), the processing proceeds to step S804. On the other hand, when the HTTP communication control unit 307 determines that the connection error is not to be generated (No in step S803), the processing proceeds to step S807.

In step S804 the communication parameter determination unit 308 determines a communication parameter to be added to the GOAWAY frame. This processing in step S804 will be described below in detail with reference to FIG. 9.

In step S805, the communication parameter adding unit 309 adds the communication parameter determined in step S804 to the GOAWAY frame.

In step S806, the HTTP communication control unit 307 transmits the GOAWAY frame, to which the communication parameter has been added in step S805, to the communication apparatus 10, and the processing is terminated.

In step S807, the HTTP communication control unit 307 transmits to the communication apparatus 10, the SETTINGS frame in which the ACK flag, indicating that the value of the received SETTINGS parameter has been determined to be correct, is set.

In step S808, the HTTP communication control unit 307 replaces the current SETTINGS parameter related to the communication apparatus 10 which is the management target, with the value of the SETTINGS parameter acquired in step S802, and the processing is terminated.

(Processing of Determining Communication Parameter)

Figure 9:
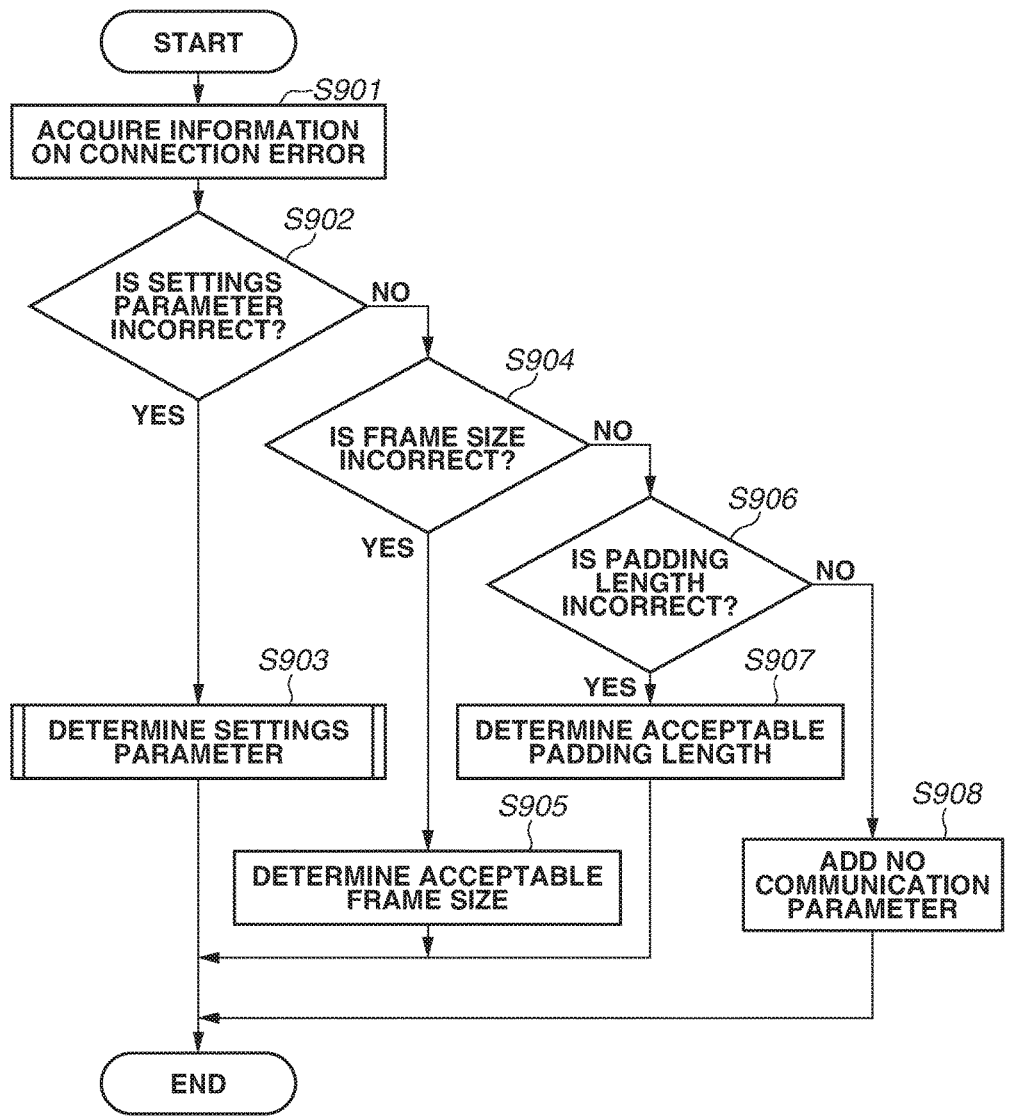
FIG. 9 is a flowchart illustrating an example of processing of determining a communication parameter to be added to the GOAWAY frame.

FIG. 9 is a flowchart illustrating an example of processing of determining a communication parameter to be added to the GOAWAY frame, executed by the communication apparatus 20. FIG. 9 illustrates processing representing details of the processing in step S804.

In step S901, the connection error determination unit 310 acquires information on the connection error. For example, the connection error determination unit 310 can acquire the information on the connection error by inquiring the cause of the error generated in step S803 of the HTTP communication control unit 307. For example, the connection error determination unit 310 receives the information on the SETTINGS frame, received in step S801, from the HTTP communication control unit 307.

In step S902, the connection error determination unit 310 executes the following processing based on the information on the connection error acquired in step S901. More specifically, the connection error determination unit 310 executes processing of determining whether the SETTINGS parameter received in step S802 is an incorrect parameter value or an unacceptable parameter value, which is the cause of the connection error. For example, the connection error determination unit 310 acquires information on a correct SETTINGS frame from the setting file stored in the auxiliary storage device of the communication apparatus 20. Then, the connection error determination unit 310 determines whether the SETTINGS parameter in the information on the connection error, acquired in step S901, is a correct or an acceptable value, based on the information on the correct SETTINGS frame thus acquired.

When the connection error determination unit 310 determines that the acquired SETTINGS parameter is an incorrect parameter value or an unacceptable parameter value, which is the cause of the connection error (Yes in step S902), the proceeds to step S903. On the other hand, when the connection error determination unit 310 determines that the acquired SETTINGS parameter is a correct parameter value or an acceptable parameter value, which is not the cause of the connection error (No in step S902), the processing proceeds to step S904.

In step S903, communication parameter determination unit 308 determines a SETTINGS parameter having a value conforming to the specification of HTTP/2 or a value acceptable by the communication apparatus 20. Then, the communication parameter determination unit 308 determines the SETTINGS parameter thus determined, as the communication parameter to be added to the GOAWAY frame, and the processing in FIG. 9 is terminated. The processing in step S903 is described below in detail with reference to FIG. 10.

In step S904, the connection error determination unit 310 determines whether the frame size of the SETTINGS frame received in step S801 is an incorrect value, which is the cause of the connection error, based on the information acquired in step S901. For example, the connection error determination unit 310 acquires the information on the correct SETTINGS frame from the setting file stored in the auxiliary storage device of the communication apparatus 20. Then, the connection error determination unit 310 determines whether the frame size of the SETTINGS frame in the information on the connection error acquired in step S901, is a correct value or an acceptable value, based on the acquired information on the correct SETTINGS frame.

When the connection error determination unit 310 determines that the frame size of the SETTINGS frame received in step S801, is an incorrect value, which is the cause of the connection error (Yes in step S904), the processing proceeds to step S905. On the other hand, when the connection error determination unit determines that the frame size of the SETTINGS frame received in step S801 is correct value and, which not the cause of the connection error (No in step S904), the processing proceeds to step S906.

In step S905, the communication parameter determination unit 308 determines a frame size of a value conforming to the specification of HTTP/2 or a value acceptable by the communication apparatus 20. Then, the communication parameter determination unit 308 determines the frame size thus determined, as the communication parameter to be added to the GOAWAY frame, and the processing in FIG. 9 is terminated.

In step S906, the connection error determination unit 310 determines whether the padding length of the SETTINGS frame received in step S801 is an incorrect value, which is the cause of the connection error, based on the information acquired in step S901. For example, the connection error determination unit 310 acquires the information on the correct SETTINGS frame from the setting file stored in the auxiliary storage device of the communication apparatus 20. Then, the connection error determination unit 310 determines whether the padding length of the SETTINGS frame in the information on the connection error acquired in step S901, is a correct value or an acceptable value, based on the acquired information.

When the connection error determination unit 310 determines that the padding length of the SETTINGS frame received in step S801 is an incorrect value, which is the cause of the connection error (Yes in step S906), the processing proceeds to step S907. On the other hand, when the connection error determination unit 310 determines that the padding length of the SETTINGS frame received in step S801 is a correct value, which is not the cause of the connection error (No in step S906), the processing proceeds to step S908.

In step S907, the communication parameter determination unit 308 determines a padding length of a value conforming to the specification of HTTP/2 or a value acceptable by the communication apparatus 20. Then, the communication parameter determination unit 308 determines the padding length thus determined, as the communication parameter to be added to the GOAWAY frame, and the processing in FIG. 9 is terminated.

In step S908, the communication parameter determination unit 308 determines that there is no communication parameter to be added to the GOAWAY frame, and the processing in FIG. 9 is terminated.

(Processing of Determining SETTINGS Parameter)

Figure 10:
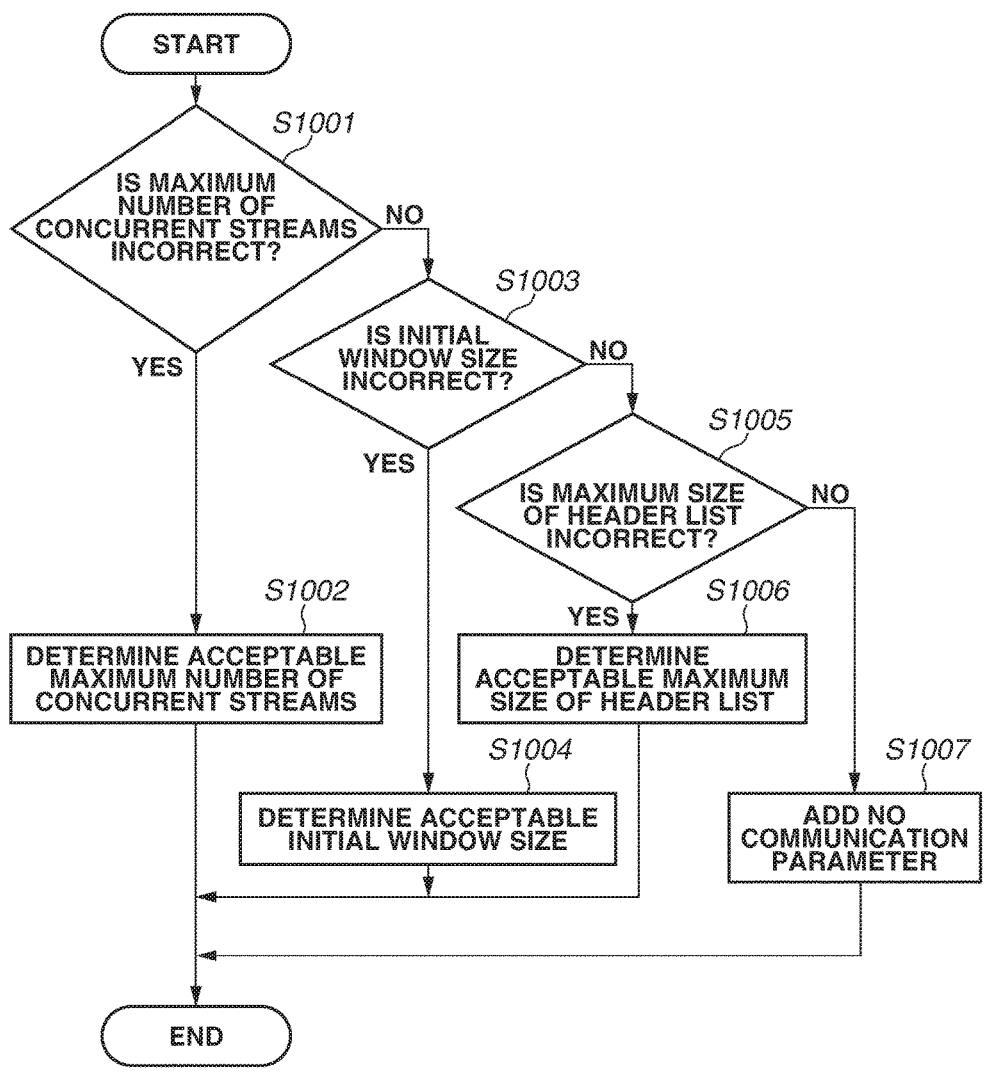
FIG. 10 is a flowchart illustrating an example of processing of determining a SETTINGS parameter to be added to the GOAWAY frame.

FIG. 10 is a flowchart illustrating an example of processing of determining the SETTINGS parameter to be added to the GOAWAY frame, executed by the communication apparatus 20. Processing in FIG. 10 represents details of the processing in step S903.

In step S1001, the connection error determination unit 310 executes the following processing based on the information acquired in step S901. More specifically, the connection error determination unit 310 determines whether the maximum number of concurrent streams, in the SETTINGS parameter, is an incorrect parameter value or an unacceptable parameter value, which is the cause of the connection error. For example, the connection error determination unit 310 acquires information on a correct SETTINGS frame from the setting file stored in the auxiliary storage device of the communication apparatus 20. Then, the connection error determination unit 310 determines whether the maximum number of concurrent streams, in the SETTINGS parameter in the information on the connection error acquired in step S901, is a correct value or an acceptable value, based on the acquired information.

When the connection error determination unit 310 determines that the maximum number of concurrent streams in the SETTINGS parameter is an incorrect parameter value or an unacceptable parameter value, which is the cause of the connection error (Yes in step S1001), the processing proceeds to step S1002. On the other hand, when the connection error determination unit 310 determines that the maximum number of concurrent streams in the SETTINGS parameter is a correct parameter value or an acceptable parameter value, which is not the cause of the connection error (No in step S1001), the processing proceeds to step S1003. The maximum number of concurrent streams is indicated by SETTINGS_MAX_CONCURRENT_STREAMS in the SETTINGS parameter.

In S1002, the communication parameter determination unit 308 determines the maximum number of concurrent streams of a value conforming to the specification of HTTP/2 or a value acceptable by the communication apparatus 20, and the processing in FIG. 10 is terminated.

In step S1003, the connection error determination unit 310 determines whether the initial window size in the SETTINGS parameter is an incorrect parameter value or an unacceptable parameter value, which is the cause of the connection error, based on the information acquired in step S901. For example, the connection error determination unit 310 acquires the information on the correct SETTINGS frame from the setting file stored in the auxiliary storage device of the communication apparatus 20. Then, the connection error determination unit 310 determines whether the initial window size in the SETTINGS parameter in the information on the connection error, acquired in step S901, is a correct value or an acceptable value, bases on the acquired information.

When the connection error determination unit 310 determines that the initial window size in the SETTINGS frame is an incorrect value or an unacceptable parameter value, which is the cause of the connection error (Yes in step S1003), the processing proceeds to step S1004. On the other hand, when the connection error determination unit 310 determines that the initial window size in the SETTINGS frame is a correct value or an acceptable parameter value, which is not the cause of the connection error (No in step S1003), the processing proceeds to step S1005. The initial window size is indicated by SETTINGS_INITIAL_WINDOW_SIZE in the SETTINGS parameter.

In step S1004, the communication parameter determination unit 308 determines an initial window size of a value conforming to the specification of HTTP/2 or a value acceptable by the communication apparatus 20, and the processing in FIG. 10 is terminated.

In step S1005, the connection error determination unit 310 determines whether the maximum size or the header list in the SETTINGS parameter is of an incorrect parameter value or an unacceptable parameter value, which is the cause of the connection error, based on the information acquired in step S901. For example, the connection error determination unit 310 acquires the information on the correct SETTINGS frame from the setting file stored in the auxiliary storage device of the communication apparatus 20. Then, the connection error determination unit 310 determines whether the maximum size of the header list in the SETTINGS parameter in the information on the connection error, acquired in step S901, is a correct value or an acceptable value, based on the information thus acquired.

When the connection error determination unit 310 determines that the maximum size of the header list in the SETTINGS parameter is an incorrect value or an unacceptable parameter value, which is the cause of the connection error (Yes in step S1005), the processing proceeds to step S1006. On the other hand, when the connection error determination unit 310 determines that the maximum size of the header list in the SETTINGS parameter is a correct value or an acceptable parameter value, which is not the cause of the connection error (No in step S1005), the processing proceeds to step S1007. The maximum size of the header list is indicated by SETTINGS_MAX_HEADER_LIST_SIZE in the SETTINGS parameter.

In step S1006, the communication parameter determination unit 308 determines the maximum size of the header list of a value conforming to the specification of HTTP/2 or a value acceptable by the communication apparatus 20, and the processing in FIG. 10 is terminated.

In step S1007, the communication parameter determination unit 308 determines that there communication parameter to be added to the GOAWAY frame, and the processing in FIG. 10 is terminated.

(Processing Executed when GOAWAY Frame is Received)

Figure 11:
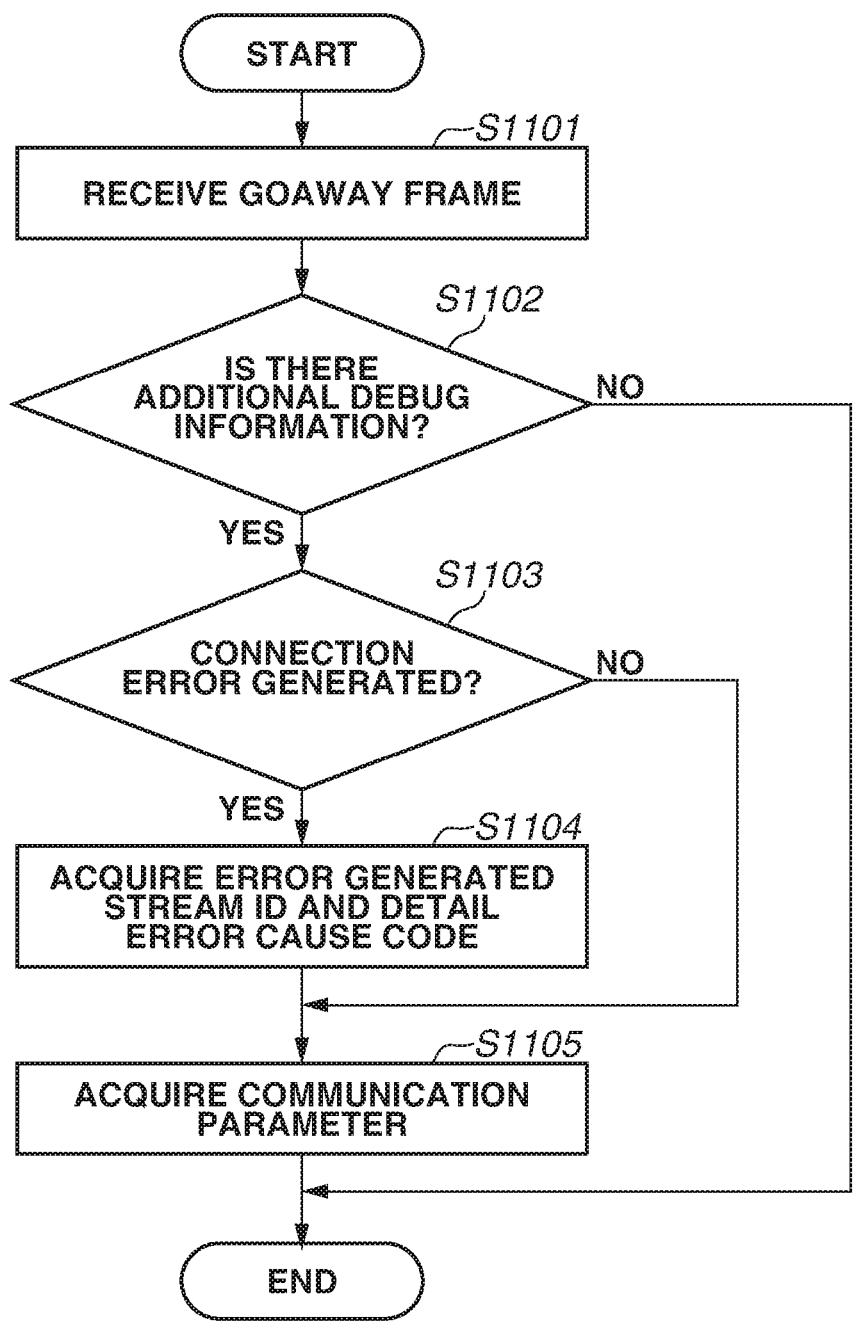
FIG. 11 is a flowchart illustrating an example of processing executed when the GOAWAY frame is received.

FIG. 11 is a flowchart illustrating an example of processing executed by the communication apparatus 10 when the GOAWAY frame is received. That the communication apparatus 20 may also receive the GOAWAY frame from the communication apparatus 10.

In step S1101, the HTTP communication control unit 407 receives the GOAWAY frame transmitted from the communication apparatus 20 in step S806.

In step S1102, the communication parameter acquisition unit 409 determines whether the GOAWAY frame, received in step S1101, includes the additional debug information. When the communication parameter acquisition unit 409 determines that the GOAWAY frame, received in step S1101, includes the additional debug information (Yes in step S1102), the processing proceeds to step S1103. On the other hand, when the communication parameter acquisition unit 409 determines that the GOAWAY frame, received in step S1101, includes no additional debug information (No in step S1102), the processing in FIG. 11 is terminated.

In step S1103, the communication parameter acquisition unit 409 determines whether the connection error is generated based on the error code in the GOAWAY frame received in step S1101. When the communication parameter acquisition unit 409 determines that the connection error is generated, the processing proceeds to step S1104. On the other hand, when the communication parameter acquisition unit 409 determines that no connection error is generated, the processing proceeds to step S1105.

In step S1104, the communication parameter acquisition unit 409 acquires the error generated stream ID and the detail error cause code in the additional debug information in the GOAWAY frame received in step S1101.

In step S1105, the communication parameter acquisition unit 409 acquires the communication parameter in the additional debug information in the GOAWAY frame received in step S1101, and stores the communication parameter in the auxiliary storage device 204 or the like, via the storage control unit 405. When there is a plurality of communication parameters, the communication parameter acquisition unit 409 acquires and stores all the communication parameters. When the processing in S1105 is completed by the communication parameter acquisition unit 409, the processing in FIG. 11 is terminated.

(Processing Executed when SETTINGS Frame is Transmitted)

Figure 12:
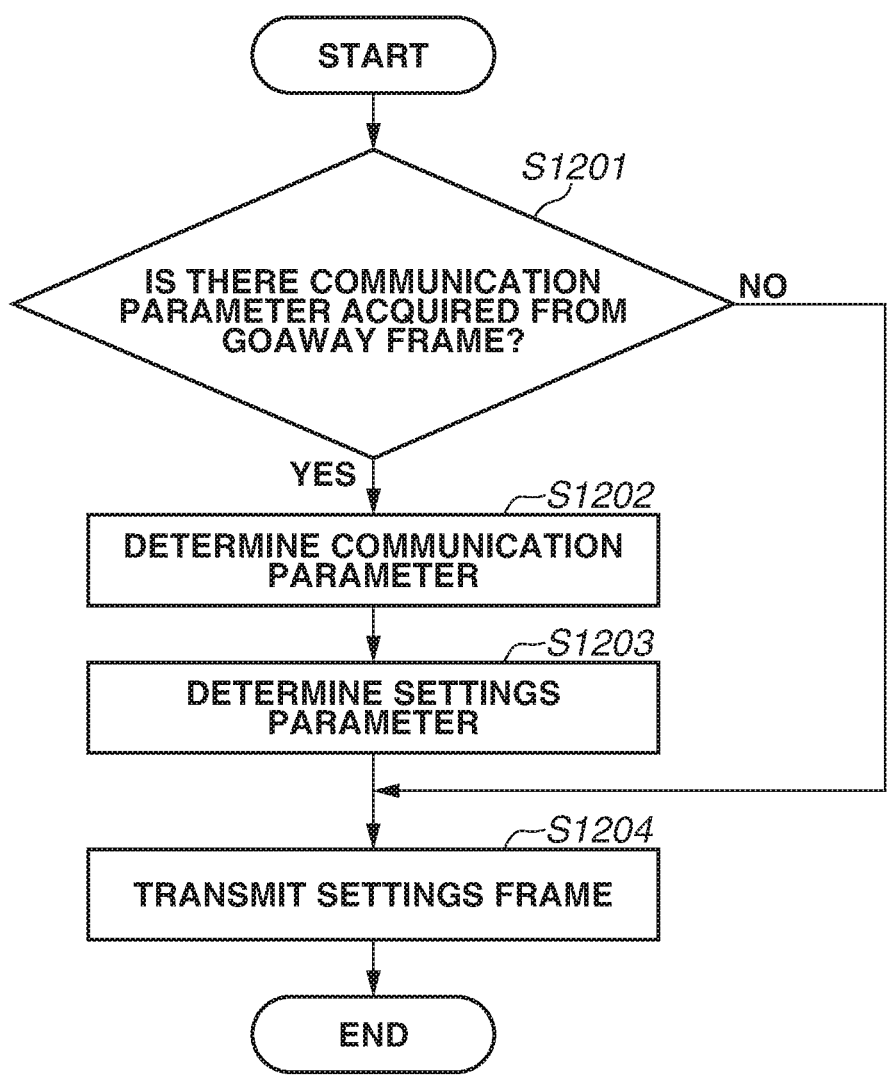
FIG. 12 is a flowchart illustrating an example of processing executed when a SETTINGS frame is transmitted.

FIG. 12 is a flowchart illustrating an example of processing executed by the communication apparatus 10 when the SETTINGS frame is transmitted. That the communication apparatus 20 can also transmit the SETTINGS frame.

In step S1201, the communication parameter determination unit 408 determines whether there is a communication parameter acquired from the GOAWAY frame received before the previously established HTTP communication connection is released. More specifically, the communication parameter determination unit 408 searches the auxiliary storage device 204 or the like for the communication parameter stored in step S1105. When the communication parameter determination unit 408 determines that the there is such a communication parameter (Yes in step S1201), the processing proceeds to step S1202. On the other hand, when the communication parameter determination unit 408 determines that the there is no such communication parameter (No in step S1201), the processing proceeds to step S1204.

In step S1202, the communication parameter determination unit 408 determines the communication parameter in the SETTINGS frame to be transmitted to the communication apparatus 20, based on the communication parameter found in step S1201. More specifically, the communication parameter determination unit 408 sets the values of the frame size, the padding length, and the like of the SETTINGS frame be transmitted to the communication apparatus 20, to be the same as those of the frame size, the padding length, and the like of the communication parameter found in step S1201.

In step S1203, the communication parameter determination unit 408 determines the SETTINGS parameter in the SETTINGS frame to be transmitted to the communication apparatus 20, based on the communication parameter determined in step S1202.

In step S1204, the HTTP communication control unit 407 transmits the SETTINGS frame including SETTINGS parameter determined in step S1203, to the communication apparatus 20, and the processing in FIG. 12 is terminated.

In the processing according to the present exemplary embodiment described above, the communication apparatus 20 receives the SETTINGS frame from the communication apparatus 10, and checks the value of the SETTINGS parameter. When the value of the SETTINGS parameter is an incorrect value not conforming to the specification or a value unacceptable by the communication apparatus 20, the communication apparatus 20 generates the connection error. Then, the communication apparatus 20 transmits, as the additional debug information in the GOAWAY frame, the SETTINGS parameter of a correct value conforming to the specification of HTTP/2 or a value acceptable by the communication apparatus 20 to the communication apparatus 10.

Then, when reestablishing the connection with the communication apparatus 20, the communication apparatus 10 transmits to the communication apparatus 20, the SETTINGS frame based on the SETTINGS parameter in the received GOAWAY frame. Thus, the connection error can be prevented from being generated with the communication apparatus 10 transmitting no SETTINGS parameter that is incorrect or unacceptable by the communication apparatus 20 again, when reestablishing connection with the communication apparatus 20. All things considered, the SETTINGS frames, for reestablishing the connection, can be transmitted and received between the communication apparatuses 10 and 20 without an error. As a result, communications for reestablishing the communication path between the communication apparatuses 10 and 20 can be completed in a shorter period of time, and connectivity for the communications between the communication apparatuses 10 and 20 can be improved.

In the present exemplary embodiment, the communication apparatuses 10 and 20 use the content of the SETTINGS parameter as the communication parameter. Alternatively, the communication apparatuses 10 and 20 may use the content of the communication parameter defined in the specification of HTTP/2, such as the content of another frame or the content related to the connection or the stream. For example, the communication apparatuses 10 and 20 may use the content (the frame size, the frame type, and the padding) of a common frame header, a state transition of a stream, a priority of a steam, dependence among the streams, and the like, as the communication parameter.

The communication apparatuses 10 and 20 can even use a communication parameter that is not defined in the specification of HTTP/2, as long as the communication parameter is usable by both the communication apparatuses 10 and 20. For example, the communication apparatuses 10 and 20 can use a communication parameter used in the other communication protocols such as a wireless LAN, TCP/IP, and TLS. In such a case, when the connection with the communication apparatus 20 is reestablished, the communication apparatus 10 can resume the communications with an optimum communication parameter. Thus, even faster communication connection processing and higher connectivity can be achieved between the communication apparatuses 10 and 20.

In the present exemplary embodiment, the connection error determination unit 310 determines whether the value of the maximum number of concurrent streams, the initial window size, or the maximum size of the header list, in the SETTINGS parameter, is correct or acceptable, through the processing in FIG. 10. Alternatively, the connection error determination unit 310 may determine whether a value of another parameter is correct or acceptable. Examples of the another parameter include the maximum size of a header compression table (HEADER_TABLE_SIZE), the maximum size of a frame payload (MAX_FRAME_SIZE), and the like. The connection error determination unit 310 may further determine whether the value of a unique SETTINGS parameter that is not defined in the specification of HTTP/2 is correct or acceptable. In such a case, even higher connectivity can be achieved for the communications between the communication apparatuses 10 and 20.

In the present exemplary embodiment, the communication parameter determination unit 308 determines a communication parameter of a value conforming to the specification of HTTP/2 or acceptable by the communication apparatus 20, as the communication parameter to be added to the GOAWAY frame. Alternatively, for example, the communication parameter determination unit 308 may determine that all of a part of communication parameters, that have been used in the communications with the communication apparatus 10 is to be added to the GOAWAY frame. More specifically, the communication parameter determination unit 308 may determine that the communication parameters used not only in the HTTP/2 communications, but also in communications using the other communication protocols such as a wireless LAN, TCP/IP, and TLS, are to be added to the GOAWAY frame. In such a case, when the connection with the communication apparatus 20 is reestablished, the communication apparatus 10 can resume the communications with an optimum communication parameter. Thus, even faster connection processing and connectivity can be achieved for the communications between the communication apparatuses 10 and 20.

In the present exemplary embodiment, the communication apparatus 20 may use information used for header compression as the communication parameter. More specifically, the communication apparatus 20 may use a header list as well as an index table, a static table, a header table, and the like that each are a table for the header compression, as the communication parameter. Thus, for example, the connection error determination unit 310 may determine whether the connection error is generated due to an incorrect content of the header compression table.

When the connection error determination unit 310 determines that the connection error is not generated, the communication parameter determination unit 308 determines the current table for the header compression, used for the HTTP communications with the communication apparatus 10, as the communication parameter to be added. Thus, the communication parameter adding unit 309 adds information on the table for the header compression, to the additional debug information in the GOAWAY frame. The communication parameter adding unit 309 may add all of or a part of the tables for the header compression, to the additional debug information in the GOAWAY frame. For example, the communication parameter adding unit 309 may add only a table for the header compression, mainly generated on a side of the communication apparatus 20, to the additional debug information in the GOAWAY frame.

The communication apparatus 10 reuses the received table for the header compression when the connection with the communication apparatus 20 is reestablished, so that the header compression can be efficiently performed immediately after the connection is reestablished, whereby even faster communication connection processing can be achieved between the communication apparatuses 10 and 20.

Furthermore, in the present exemplary embodiment, the communication apparatus 20 may determine the content of the communication parameter added to the GOAWAY frame, in accordance with a reliability of communication apparatus 10. More specifically, a setting file or the like, including information on the reliability of another communication apparatus to be the communication partner, is stored in advance in the auxiliary storage device or the like of the communication apparatus 20. The communication apparatus 20 acquires the reliability of the communication apparatus 10 from the setting file or the like stored in the auxiliary storage device or the like of the communication apparatus 20.

The communication apparatus 20 adds security/privacy information to the GOAWAY frame to be transmitted to the communication apparatus 10, when the acquired reliability of communication apparatus 10 is equal to or higher than a set threshold. The communication apparatus 20 adds no security/privacy information to the GOAWAY frame to be transmitted to the communication apparatus 10, when the acquired reliability of communication apparatus 10 is lower than the set threshold. Thus, a security risk can be reduced with the communication apparatus 20 transmitting no security/privacy information to a communication partner that is not fully reliable.

In the present exemplary embodiment, the communication apparatuses 10 and 20 execute the protocol upgrade at the time when the communications start to perform communications in accordance with the protocol in which when the connection error occurs, the communication apparatus 10 or 20 transmits a signal indicating termination of the communications to communication partner. Alternatively, the communication apparatuses 10 and 20 may perform communications using a protocol in which the communication apparatus 10 and 20 transmit communication setting information to each other at the time when the communications start, and the communication apparatus 10 or 20 transmits the signal indicating the termination of the communications to the communication partner when the connection error occurs. In such a case, the connection cannot be reestablished in a shorter period of time, but the connectivity can be improved for the communications between the communication apparatuses 10 and 20.

A second exemplary embodiment will be described. In the present exemplary embodiment, the communication apparatus 20 adds a communication parameter to the GOAWAY frame based on a communication relationship between the communication apparatuses 10 and 20. The communication relationship indicates whether there are ongoing communications between the communication apparatuses. When there is the communication relationship between the communication apparatuses 10 and 20, it means that there is series of ongoing communications, such as a session, between the communication apparatuses 10 and 20. The system configuration of the communication system and the hardware configurations of the communication apparatuses 10 and 20 are the same between the present exemplary embodiment and the first exemplary embodiment. Portions that are different from the first exemplary embodiment will be described below.

(Functional Configuration)

Figure 13:
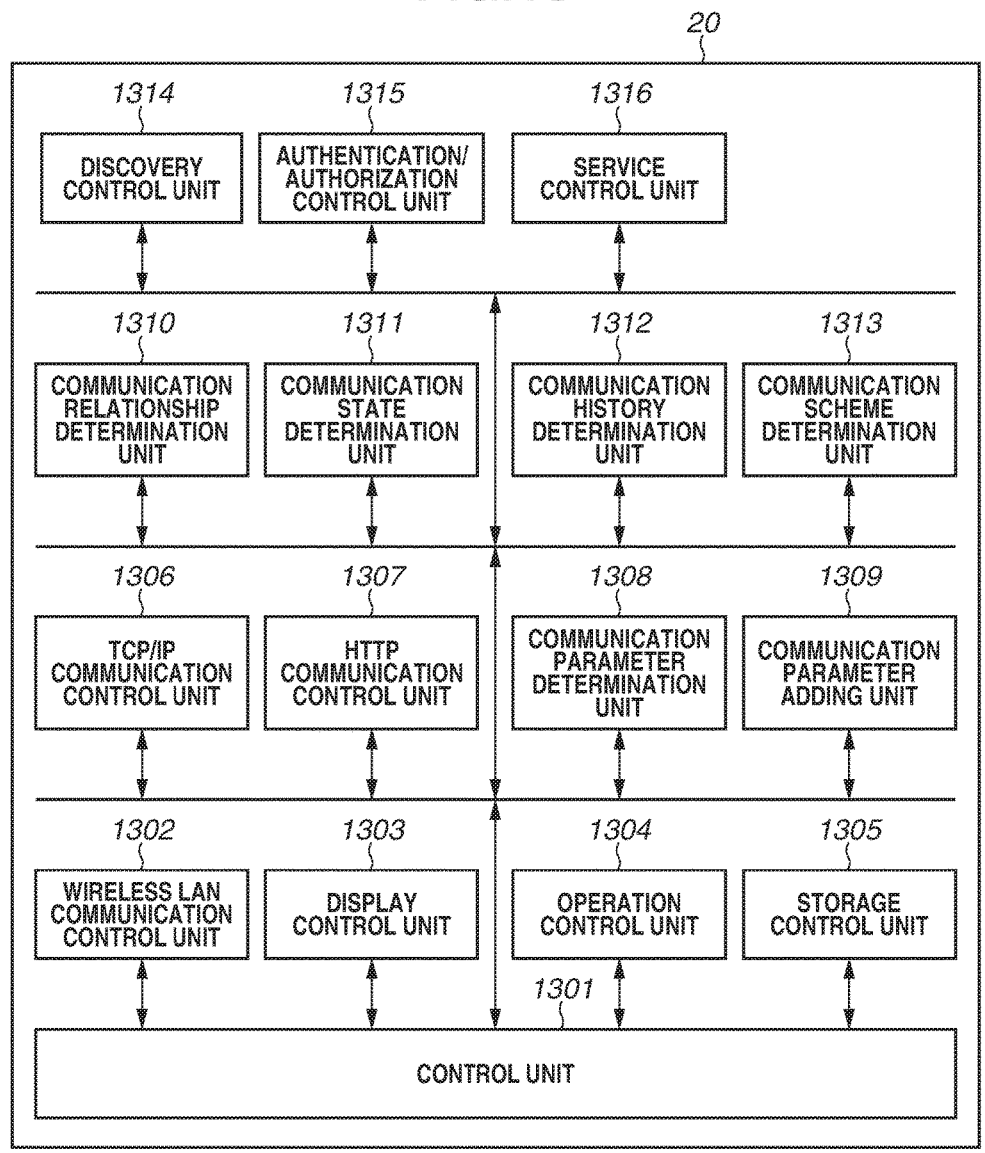
FIG. 13 is a diagram illustrating an example of a functional configuration of the communication apparatus.

FIG. 13 illustrates an example of a functional configuration of the communication apparatus 20 according to the present exemplary embodiment. Functional configuration elements in FIG. 13 that are the same as the counterparts in FIG. 3 will not be described. Functional configuration elements 1301 to 1309 respectively are the same as the functional configuration elements 301 to 309.

A discovery control unit 1314 performs control for discovering the communication apparatus 10 on the wireless LAN, via the TCP/IP communication control unit 1306 or the HTTP communication control unit 1307. More specifically, the discovery control unit 1314 has a function of discovering the communication apparatus 10 on the wireless LAN. The discovery control unit 1314 also has a function of notifying the communication apparatus 10 on the wireless LAN that the communication apparatus 20 has joined or left the wireless LAN.

In the present exemplary embodiment, the discovery control unit 1314 uses a Simple Service Discovery Protocol (SSDP) scheme used in Universal Plug and Play (UPnP) standard. The method used by the discovery control unit 1314 is not limited to SSDP scheme, and may be another discovery method including multicast Domain Name Service (mDNS), Bonjour (registered trademark), Service Discovery Protocol (SDP), and the like, for example.

An authentication/authorization control unit 1315 executes authentication/authorization processing, related to a user and the communication apparatus 20, for the communication apparatus 10 via the HTTP communication control unit 1307. In the present exemplary embodiment, the authentication/authorization control unit 1315 uses an HTTP authentication (Basic authentication/Digest authentication) scheme. The authentication/authorization control unit 1315 may also use another authentication/authorization scheme as OAuth 2.0, OpenID, OpenID Connect, or Security Assertion Markup Language (SAML).

A service control unit 1316 provides a service to the communication apparatus 10 via the HTTP communication control unit 1307. In the present exemplary embodiment, the service control unit 1316 uses Digital Living Network Alliance (DLNA), UPnP, and Web service schemes. The service control unit 1316 may also use another service control method including Simple Object Access Protocol (SOAP), Representational State Transfer (REST), AtomPublishing Protocol (AtomPub), and the like.

(Determination Processing for Communication Relationship)

Functions used for determining whether there is communication relationship with the communication apparatus 10 will be described.

A communication relationship determination unit 1310 determines whether there is a network-based communication relationship with the communication apparatus 10, via one or a plurality of a communication state determination unit 1311, a communication history determination unit 1312, and a communication scheme determination unit 1313.

The communication state determination unit 1311 acquires information on a communication state regarding the communication apparatus 10, and determines whether there is the communication relationship with the communication apparatus 10 based on the information on the communication state thus acquired. The communication state determination unit 1311 can determine whether there is the communication relationship with the communication apparatus 10 based on information on the communication state described below. The information on the communication state regarding the communication apparatus 10 is an example of communication state information.

The communication state determination unit 1311 acquires information on a wireless LAN communication state regarding the communication apparatus 10, from the wireless LAN communication control unit 1302. The communication state determination unit 1311 can determine whether there is the communication relationship with the communication apparatus 10, based on the information thus acquired.

Examples of the information acquired by the communication state determination unit 1311 include event information, indicating start/end of wireless LAN (Wi-Fi) connection, completion of authentication for wireless LAN communications, and detection of a beacon or detection of no beacon, as well as setting information of a wireless LAN connection mode (an infrastructure mode or an ad hoc mode), and the like. The communication state determination unit 1311 determines whether there is the communication relationship with the communication apparatus 10 based on the event information or the setting information thus acquired.

For example, the communication state determination unit 1311 determines that there is the communication relationship with the communication apparatus 10, when the event information indicating the start of the wireless LAN (Wi-Fi) connection is acquired, and the event information indicating the end of the connection is not acquired. Furthermore, the communication state determination unit 1311 may determine whether there is the communication relationship with the communication apparatus 10, based on event information indicating start/end of Wi-Fi Direct connection, a wireless LAN communication error, or the like.

The communication state determination unit 1311 also acquires information on a TCP/IP communication state regarding the communication apparatus 10 from the TCP/IP communication control unit 1306, and determines whether there is the communication relationship with the communication apparatus 10 based on the information thus acquired.

For example, the communication state determination unit 1311 acquires the information on the TCP/IP communication state regarding the communication apparatus 10 from the TCP/IP communication control unit 1306. The communication state determination unit 1311 acquires the information on the TCP/IP communication state indicating TCP connection/disconnection, an error generation state, a delay state, a packet retransmission state, a data transfer amount, a flow control state, a line quality, and a TCP/IP communication error.

The communication state determination unit 1311 determines whether there is the communication relationship with the communication apparatus 10 based on the information on the TCP/IP communication state thus acquired. For example, the communication state determination unit 1311 determines that there is the communication relationship with the communication apparatus 10 when the information indicating the TCP connection is acquired and information indicating the TCP disconnection is not acquired.

The communication state determination unit 1311 determines whether there is the communication relationship with the communication apparatus 10, also based on the information on an HTTP communication state regarding the communication apparatus 10, via the HTTP communication control unit 1307. For example, the communication state determination unit 1311 acquires the information on the HTTP communication state regarding the communication apparatus 10 from the HTTP communication control unit 1307. The communication state determination unit 1311 acquires information on the HTTP communication state indicating start (HEADERS+PRIORITY frame)/end (GO-AWAY frame) of the HTTP communications, the number of concurrent HTTP communications (the number of multi-sessions), an HTTP communication error, and the like.

The communication state determination unit 1311 determines whether there is the communication relationship with the communication apparatus 10, based on the information on the HTTP communication state thus acquired. For example, the communication state determination unit 1311 determines that there is the communication relationship with the communication apparatus 10, when information indicating the start of the HTTP communications is acquired and information (GOAWAY frame) indicating the end of the HTTP communication is not acquired.

The communication state determination unit 1311 determines whether there is the communication relationship with the communication apparatus 10, also based on information on a discovery state on the wireless LAN regarding the communication apparatus 10, via the discovery control unit 1314.

For example, the communication state determination unit 1311 acquires from the discovery control unit 1314, the information on the discovery state indicating that the communication apparatus 20 has joined/left the wireless LAN, that the communication apparatus 10 has been discovered on/joined/left the wireless LAN, and the like.

The communication state determination unit 1311 determines whether there is the communication relationship with the communication apparatus 10, based on the information on the discovery state thus acquired. For example, the communication state determination unit 1311 determines that there is the communication relationship with the communication apparatus 10, when information on the discovery state indicating that the communication apparatuses 10 and 20 have joined the wireless LAN is acquired and information on the discovery state indicating that the communication apparatuses 10 and 20 have left the wireless LAN is not acquired.

The communication state determination unit 1311 also determines whether is communication relationship with the communication apparatus 10, based on information fin an authentication/authorization state regarding the communication apparatus 10, via the authentication/authorization control unit 1315.

For example, the communication state determination unit 131 acquires information on the authentication/authorization state from the authentication/authorization control unit 1315. More specifically, the communication state determination unit 1311 acquires information indicating start/end of authentication/authorization, user login/logout, authenticated/unauthenticated, authorization approved/denied, authentication valid period expired/not expired, access token valid/invalid, access token valid period expired/not expired, and the like.

The communication state determination unit 1311 determines whether there is the communication relationship with the communication apparatus 10, based on the information on the authentication/authorization state thus acquired. For example, the communication state determination unit 1311 determines that there is the communication relationship with the communication apparatus 10, when information on the authentication/authorization state indicating the start of the authentication/authorization is acquired, and information on the authentication/authorization state indicating the end of the authentication/authorization is not acquired.

The communication state determination unit 1311 determines whether there is the communication relationship with the communication apparatus 10, also based on information on a service provision/use state regarding the communication apparatus 10, via the service control unit 1316.

For example, the communication state determination unit 1311 acquires information on the service provision/use state from the service control unit 1316. The communication state determination unit 1311 acquires the information on the service provision/use state indicating start/end of the service provision, start/end of the service use, and the like.

The communication state determination unit 1311 determines whether there is the communication relationship with the communication apparatus 10, based on the information on the service provision/use state thus acquired. For example, the communication state determination unit 1311 determines that there is the communication relationship with the communication apparatus 10, when information on the service provision/use state indicating the start of the service provision is acquired, and information on the service provision/use state indicating the end of the service provision is not acquired.

The communication state determination unit 1311 may determine whether there is the communication relationship, based on a combination of a plurality of pieces of information on the communication state. The plurality of pieces of information on the communication state includes the information on the wireless LAN communication state, the information on the TCP/IP communication state, the information on HTTP communication state, the information on the discovery state on the wireless LAN, the information on the authentication/authorization state, and the information on the service provision/use state regarding the communication apparatus 10 that are described above, and the like.

The communication history determination unit 1312 determines whether there is the communication relationship with the communication apparatus 10 based on information on a communication history with the communication apparatus 10. For example, the communication history determination unit 1312 executes processing described below. The information on the communication history regarding the communication apparatus 10 is one example of communication history information.

The communication history determination unit 1312 determines whether there is the communication relationship with the communication apparatus 10, based on the information a wireless LAN communication history regarding the communication apparatus 10 via the wireless LAN communication control unit 1302.

For example, the communication history determination unit 1312 acquires the information on the history of the wireless LAN communications with the communication apparatus 10, from a log file or the like stored in the auxiliary storage device and the like of the communication apparatus 20, via the wireless LAN communication control unit 1302. The communication history determination unit 1312 acquires the information on the history of the wireless LAN communications with the communication apparatus 10, indicating wireless LAN connection/disconnection, the connection mode (infrastructure/ad hoc, Wi-Fi Direct, and a permanent or temporal group of Wi-Fi Direct), and the like.

The communication history determination unit 1312 determines whether there is the communication relationship with the communication apparatus 10, based on the information thus acquired. For example, the communication history determination unit 1312 determines that there is the communication relationship with the communication apparatus 10, when information on the wireless LAN communication history indicating the connection to the wireless LAN by the communication apparatus 10 is acquired, and the information on the story of the wireless LAN communication indicating the disconnection from the wireless LAN by the communication apparatus is not acquired.

The communication history determination unit 1312 determines whether there is the communication relationship with the communication apparatus 10, also based on information on a TCP/IP communication history regarding the communication apparatus 10, via the TCP/IP communication control unit 1306.

For example, the communication history determination unit 1312 acquires the information on the TCP/IP communication history regarding the communication apparatus 10 from the log file or the like stored in the auxiliary storage device and the like of the communication apparatus 20 via the TCP/IP communication control unit 1306. More specifically, the communication history determination unit 1312 acquires information on the TCP/IP communication history indicating a domain name, a host name, an IP address, and port number of the communication apparatus 10, TCP/IP connection that has been established/released with the communication apparatus 10, and the like.

Then, the communication history determination unit 1312 determines whether there is the communication relationship with the communication apparatus 10, based on the information thus acquired. For example, the communication history determination unit 1312 determines that there the communication relationship with the communication apparatus 10, when information on the TCP/IP communication history indicating the TCP/IP connection by the communication apparatus 10 is acquired, and information on the TCP/IP communication history indicating the TCP/IP disconnection by the communication apparatus 10 is not acquired.

The communication history determination unit 1312 determines whether there is the communication relationship, also based on information on an HTTP communication history regarding the communication apparatus 10, via the HTTP communication control unit 1307.

For example, the communication history determination unit 1312 acquires the information on the HTTP communication history regarding the communication apparatus 10 from the log file or the like stored in the auxiliary storage device and the like of the communication apparatus 20, the HTTP communication control unit 1307. The communication history determination unit 1312 acquires the information on the HTTP communication history regarding the communication apparatus 10, indicating a universal resource indicator (URI) of the communication apparatus 10, the content of a transmitted HTTP request, the content of a received HTTP response, an HTTP communication (Session) ID, an HTTP stream ID, Cookie, and the like.

The communication history determination unit 1312 determines whether there is the communication relationship with the communication apparatus 10, based on the information thus acquired. For example, the communication history determination unit 1312 determines that there is the communication relationship with the communication apparatus 10, when HTTP request for requesting disconnection is acquired.

The communication history determination unit 1312 determines whether there is the communication relationship, also based on information on a history of discovery on the wireless LAN regarding the communication apparatus 10, via the discovery control unit 1314.

For example, the communication history determination unit 1312 acquires information on a history of discovery on the wireless LAN regarding the communication apparatus 10 from the log file or the like stored in the auxiliary storage device and the like of the communication apparatus 20, via the discovery control unit 1314. The communication history determination unit 1312 acquires the information on the discovery history indicating the joining/leaving of the communication apparatus 10 to/from the wireless LAN as well as the number of times and the date thereof, the discovery/joining/leaving of the communication apparatus 10 on/to/from the wireless LAN as well as the number of times and the date thereof, and the like.

The communication history determination unit 1312 determines whether there is the communication relationship with the communication apparatus 10, based on the information thus acquired. For example, the communication history determination unit 1312 determines that there is the communication relationship with the communication apparatus 10, when the discovery history information indicating that the communication apparatus 10 has joined the wireless LAN is acquired, and the discovery history information indicating that the communication apparatus 10 has left the wireless LAN is not acquired.

The communication history determination unit 1312 determines whether there is the communication relationship, also based on the information on an authentication/authorization history regarding communication apparatus 10, via the authentication/authorization control unit 1315.

For example, the communication history determination unit 1312 acquires the information on the authentication/authorization history regarding the communication apparatus 10 from the log file or the like stored in the auxiliary storage device and the like of the communication apparatus 20, via the authentication/authorization control unit 1315. More specifically, the communication history determination unit 1312 acquires the information on the authentication/authorization history indicating authentication/authorization/login/logout as well as the number of times and the date thereof, ID/password and the like authenticated/authorized, the number of approved times, and the like. The communication history determination unit 1312 may acquire the information on the authentication/authorization history indicating an ID/range of authority/quantity/valid period of an issued access token, an invalidated access token, and the like.

Then, the communication history determination unit 1312 determines whether there is communication relationship with the communication apparatus 10, based on the information thus acquired. For example, the communication history determination unit 1312 determines that there is the communication relationship with the communication apparatus 10, when information on the authentication/authorization history indicating login performed by the communication apparatus 10 acquired, and the information on the authentication/authorization history indicating logout performed by the communication apparatus 10 is not acquired.

The communication history determination unit 1312 determines whether there is the communication relationship, also based on information on a service provision/use history regarding the communication apparatus 10, via the service control unit 1316.

For example, the communication history determination unit 1312 acquires the information on the service provision/use history regarding the communication apparatus 10, from the log file or the like stored in the auxiliary storage device and the like of the communication apparatus 20 via the service unit 1316. The communication history determination unit 1312 acquires the information on the service provision/use history regarding the communication apparatus 10, indicating the type/content of a service provided/used, whether the service is provided/used, and the like.

Then, the communication history determination unit 1312 determines whether there is the communication relationship with the communication apparatus 10, based on information thus acquired. For example, the communication history determination unit 1312 determines that there is the communication relationship with the communication apparatus 10, when the information on the service provision/use history indicating that the provision of the service to the communication apparatus 10 has not been completed is acquired.

The communication history determination unit 1312 can also acquire information indicating the communication connection established/released with the communication apparatus 10 so far, the number of communications, the date of the communication, communication success/failure, error type, and the like, by reading the information from the log file or the like stored in the auxiliary storage device and the like of the communication apparatus 20.

The communication history determination unit 1312 may determine whether there is the communication relationship based on a combination of a plurality of pieces of communication history information including the information on the wireless LAN communication history, the information on the TCP/IP communication history, the information the HTTP communication history, the information on the discovery history on the wireless LAN, the information on the authentication/authorization history, and the information on the service provision/use history that are described above, and the like.

The communication scheme determination unit 1313 determines whether there the communication relationship with the communication apparatus 10, based on information on a communication scheme regarding the communication apparatus 10. The communication scheme determination unit 1313 executes the processing described below. The information on the communication scheme retarding the communication apparatus 10 is an example of the communication scheme information.

The communication scheme determination unit 1313 determines whether there is the communication relationship, based on information on a wireless LAN communication scheme regarding the communication apparatus 10, via the wireless LAN communication control unit 1302.

For example, the communication scheme determination unit 1313 acquires the information on the wireless LAN communication scheme regarding the communication apparatus 10 from the wireless LAN communication control unit 1302. The communication scheme determination unit 1313 acquires the information on the wireless LAN communication scheme indicating whether wireless direct communications are performed with the communication apparatus 10, whether Wi-Fi Protected Setup (WPS) communications are performed with the communication apparatus 10, and the like. The communication scheme determination unit 1313 may further acquire information on the wireless LAN communication scheme indicating whether Wi-Fi Direct communications are performed, whether Wi-Fi Direct Service communications are performed, whether Wi-Fi Miracast communications are performed, and the like.

Then, the communication scheme determination unit 1313 determines whether there is the communication relationship with the communication apparatus 10, based on the information thus acquired. For example, the communication scheme determination unit 1313 determines that there is the communication relationship with the communication apparatus 10, when information on the wireless LAN communication scheme indicating that the wireless direct communications are performed with the communication apparatus 10 is acquired.

The communication scheme determination unit determines whether there is the communication relationship, based on information on a TCP/IP communication scheme regarding the communication apparatus 10, via the TCP/IP communication control unit 1306.

For example, the communication scheme determination unit 1313 acquires the information on the TCP/IP communication scheme regarding the communication apparatus 10, from the TCP/IP communication control unit 1306. The communication scheme determination unit 1313 acquires the information on the TCP/IP communication scheme indicating whether Virtual Private Network (VPN) communications are performed, and the like. The communication scheme determination unit 1313 may acquire information on the TCP/IP communication scheme indicating whether Security Architecture for Internet Protocol (IPsec) communications are performed, and the like.

Then, the communication scheme determination unit 1313 determines whether there is the communication relationship with the communication apparatus 10, based on the information thus acquired. For example, the communication scheme determination unit 1313 determines that there is the communication relationship with the communication apparatus 10, when information on the TCP/IP communication scheme indicating that the VPN communications are performed with the communication apparatus 10 is acquired.

The communication scheme determination unit 1313 determines whether there is the communication relationship, also based on the information on an HTTP communication scheme regarding the communication apparatus 10, via the HTTP communication control unit 1307.

For example, the communication scheme determination unit 1313 acquires the information on the HTTP communication scheme from the HTTP communication control unit 1307. The communication scheme determination unit 1313 acquires information on the HTTP communication scheme indicating whether HTTPS(TLS) communications are performed, whether PROXY communications are performed, and the like.

Then, the communication scheme determination unit 1313 determines whether there is the communication relationship with the communication apparatus 10, based on the information thus acquired. For example, the communication scheme determination unit 1313 determines that there is the communication relationship with the communication apparatus 10, when the information on the HTTP communication scheme indicating that the HTTPS (TLS) communications are performed with the communication apparatus 10 is acquired.

The communication scheme determination unit 1313 determines whether there is the communication relationship, also based on information on a scheme of discovery on the wireless LAN regarding the communication apparatus 10, via the discovery control unit 1314. For example, the communication scheme determination unit 1313 acquires the information on the scheme of discovery on the wireless LAN regarding the communication apparatus 10, via the discovery control unit 1314. The communication scheme determination unit 1313 acquires the information on the scheme of discovery on the wireless LAN indicating whether SSDP is employed, whether mDNS is employed, whether Bonjour is employed, whether SDP is employed, and the like.

Then, the communication scheme determination unit 1313 determines whether there is the communication relationship with the communication apparatus 10, based on the information thus acquired. For example, the communication scheme determination unit 1313 determines that there is the communication relationship with the communication apparatus 10, when the information on the scheme of discovery on the wireless LAN indicating that the SSDP is employed for the communication apparatus 10 is acquired.

The communication scheme determination unit 1313 determines whether there is the communication relationship, also based on information on an authentication/authorization scheme regarding the communication apparatus 10, via the authentication/authorization control unit 1315.

For example, the communication scheme determination unit 1313 acquires the information on the authentication/authorization scheme regarding the communication apparatus 10 from the authentication/authorization control unit 1315. The communication scheme determination unit 1313 acquires information on the authentication/authorization method indicating whether HTTP authentication (Basic authentication, Digest authentication) is employed, whether OAuth 2.0 is employed, whether OpenID is employed, whether OpenID Connect is employed, whether SAML is employed, and the like.

The communication scheme determination unit 1313 determines whether there is the communication relationship with the communication apparatus 10, based on the information thus acquired. For example, the communication scheme determination unit 1313 determines that there is the communication relationship with the communication apparatus 10, when information on the authentication/authorization scheme indicating that the HTTP authentication is employed for the communication apparatus 10 is acquired.

The communication scheme determination unit 1313 determines whether there is the communication relationship, also based on information on a service provision/use scheme regarding the communication apparatus 10, via the service control unit 1316.

For example, the communication scheme determination unit 1313 acquires information on the service provision/use scheme indicating whether DLNA is employed, whether UPnP is employed, whether SOAP is employed, whether REST is employed, whether AtomPub is employed, and the like.

Then, the communication scheme determination unit 1313 determines whether there is the communication relationship with the communication apparatus 10, based on the information thus acquired. For example, the communication scheme determination unit 1313 determines that there the communication relationship with the communication apparatus 10, when information on the service provision/use scheme indicating that the DLNA is employed for the communication apparatus 10 is acquired.

The communication scheme determination unit 1313 may determine whether there is the communication relationship, based on a combination of a plurality of pieces of information on a communication scheme including the information on the wireless LAN communication scheme, the information on the TCP/IP communication scheme, the information on the HTTP communication scheme, the information on the discovery method on the wireless LAN, the information on the authentication/authorization scheme, and the information on the service provision/use scheme that are described above, and the like.

The communication relationship determination unit 1310 may determine whether there is the communication relationship with the communication apparatus 10 based on information on an apparatus state of the communication apparatus 10 and the like, in addition to the communication state information, the communication history information, and the communication scheme information. For example, the communication relationship determination unit 1310 acquires information on a power supply state of the communication apparatus 10, mode information on a communication mode and an image capturing mode of the communication apparatus 10, and the like, from the discovery control unit 1314 and the like.

The communication relationship determination unit 1310 determines whether there is the communication relationship with the communication apparatus 10, based on the information on the apparatus state of the communication apparatus 10 and the like thus acquired. For example, the communication relationship determination unit 1310 determines that there is the communication relationship with the communication apparatus 10, when the power supp state of the communication apparatus 10 is ON.

(Communication Processing)

Communication processing executed between the communication apparatuses 10 and 20 according to present exemplary embodiment is described below in detail.

(Processing of Establishing, Releasing, and Reestablishing Communication Connection)

Figure 14:
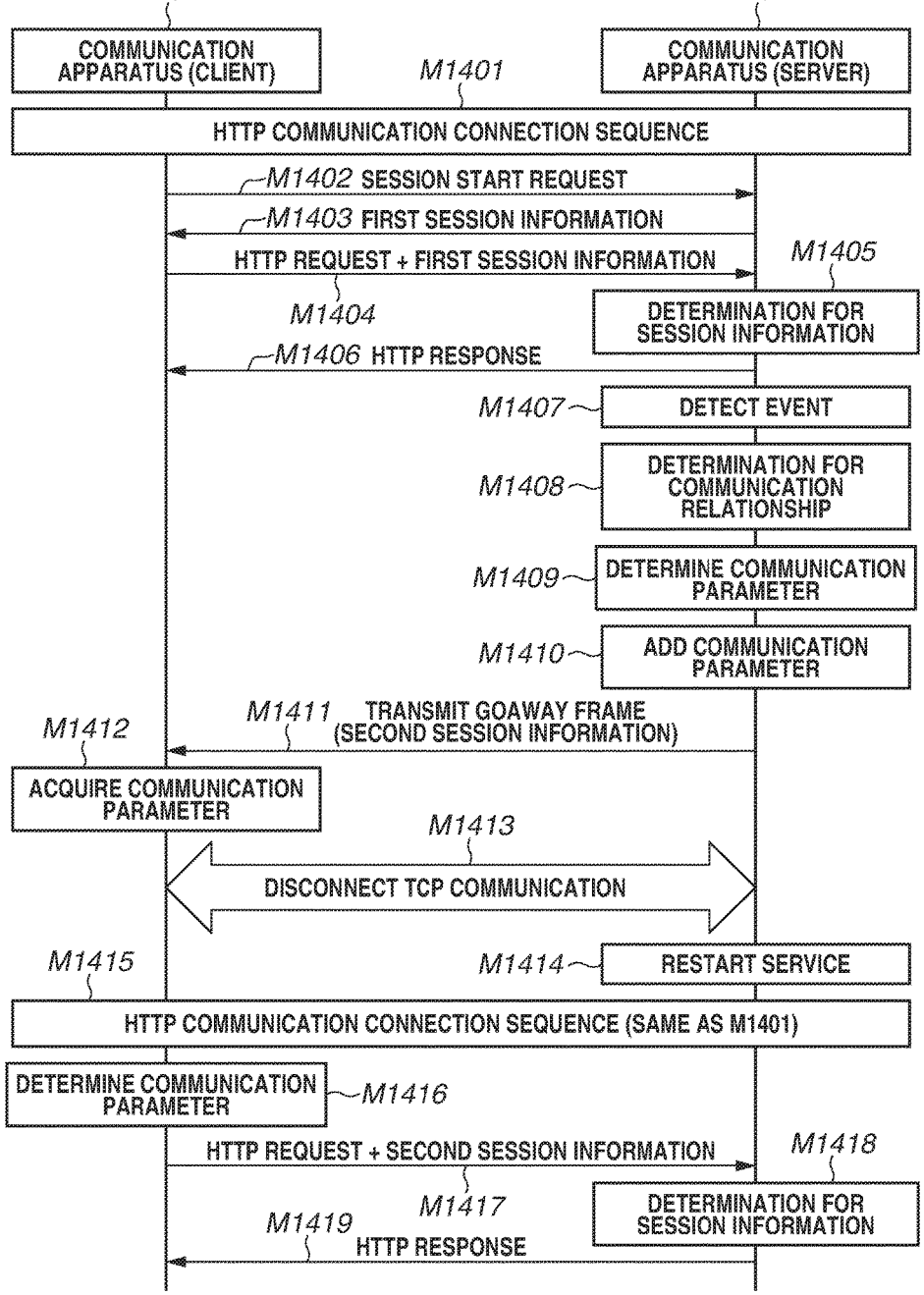
FIG. 14 is a sequence diagram illustrating an example of HTTP communication processing between the communication apparatuses.

FIG. 14 is a sequence diagram illustrating an example of HTTP communication processing between the communication apparatuses 10 and 20. Processing in FIG. 14 different from that in FIG. 6 will be described.

Processing in M1401 is the same as that in M601.

In M1402, the HTTP communication control unit 407 transmits a session start request to the communication apparatus 20, for using a service provided by the communication apparatus 20. In the present exemplary embodiment, each HTTP communication connection established between the communication apparatuses 10 and 20 is managed as a session. For example, in a case where the communication apparatus 10 starts communications with the communication apparatus 20 to use a certain service, and ends the communications with the communication apparatus 20 when the use of service is completed, the session represents a series of communications performed between the start and the end of the communications. The communication apparatuses 10 and 20 manage the session based on session information with which the session can be uniquely identified. The communication apparatuses 10 and 20 may manage the session with other session management schemes including HTTP Cookie protocol, Session Description Protocol (SDP), Session Initiation Protocol (SIP), and the like.

In M1403, the HTTP communication control unit 1307 transmits first session information to the communication apparatus 10. In the present exemplary embodiment, the HTTP communication control unit 1307 transmits information with which the session can be uniquely identified, as the first session information. The HTTP communication control unit 1307 may transmit another piece of session information such as HTTP Cookie information, SDP information, and the like, as the first session information.

In M1404, the HTTP communication control unit 407 transmits an HTTP request, together with the first session information, to the communication apparatus 20.

In M1405, the communication state determination unit 1311 determines whether the first session information, received from the communication apparatus 10 in M1404, is valid. It is assumed in the present exemplary embodiment that the first session information, transmitted in M1404, is determined as being valid by the communication state determination unit 1311.

In M1406, the HTTP communication control unit 1307 transmits an HTTP response, for the HTTP request transmitted in M1404, to the communication apparatus 10.

In M1407, the HTTP communication control unit 1307 detects an event requiring the HTTP communications connection, established with the communication apparatus 10, to be released. It is assumed in the present exemplary embodiment that the HTTP communication control unit 1307 detects an event of restarting the service provided to the communication apparatus 10 by the communication apparatus 20, as the event requiring the HTTP communications connection, established, with the communication apparatus 10, to be released. The HTTP communication control unit 1307 may also detect a connection error, restarting of a program, reestablishment of the wireless LAN communication connection, connection/disconnection to a network, restarting of the power supply, and the like, as the event requiring the HTTP communication connection to be released.

In M1408, the communication relationship determination unit 1310 determines whether the communication relationship with the communication apparatus 10 is to be maintained, via the communication state determination unit 1311, the communication history determination unit 1312, and the communication scheme determination unit 1313. The communication relationship determination unit 1310 determines whether there the communication relationship with the communication apparatus 10 through the method described above in the description of the communication relationship determination unit 1310 in FIG. 13 and the like, and determines that the communication relationship with the communication apparatus 10 is to be maintained upon determining that there is the communication relationship with the communication apparatus 10.

The communication relationship determination unit 1310 determines that normal communication disconnecting processing is to be executed upon determining that there no communication relationship with the communication apparatus 10. In such a case, a normal GOAWAY frame with no communication parameter and the like added is transmitted from the communication apparatus 20 to the communication apparatus 10. Then, the communication apparatus 10 reestablishes a connection with the communication apparatus 20 through normal connection processing. It assumed in the present exemplary embodiment that the HTTP communication control unit 307 determines that the communication relationship with the communication apparatus 10 is to be maintained.

In M1409, the communication parameter determination unit 1308 determines a communication parameter required for maintaining the communication relationship with the communication apparatus 10. In the present exemplary embodiment, the communication parameter determination unit 1308 determines second session information, for newly managing a session with the communication apparatus 10, as the communication parameter required for maintaining the communication relationship with the communication apparatus 10. The second session information may be session information associated with the first session information or may be the same as the first session information.

M1410, the communication parameter adding unit 1309 adds a value of the second session information, serving as communication parameter 506 in the additional debug information 503, determined in M1409, to the GOAWAY frame to be transmitted to the communication apparatus 10.

In M1411, the HTTP communication control unit 1307 transmits the GOAWAY frame, generated in M1410, to the communication apparatus 10.

Processing in M1412 is the same as the processing in M607, and Processing in M1413 is the same as the processing in M608. In M1414, the service control unit 1316 restarts the service provided to the communication apparatus 10.

Processing in M1415 is the same as the processing in M609.

In M1416, the communication parameter determination unit 408 checks whether there is a communication parameter acquired in M1412, and determines the second session information based on the communication parameter acquired in M1412. The communication apparatus 10 receives the second session information from the communication apparatus 20 before the previous HTTP communication connection is released, and thus the session start request processing as in M1402 can be omitted, whereby faster connection processing can be achieved.

In M1417, the HTTP communication control unit 407 transmits an HTTP request, together with the second session information, to the communication apparatus 20.

In M1418, the communication state determination unit 1311 determines whether the second session information, received from the communication apparatus 10 in M1417, is valid. It is assumed in the present exemplary embodiment that the second session information, transmitted in M1417, is determined as being valid by the communication state determination unit 1311.

In M1419, the HTTP communication control unit 1307 transmits an HTTP response, for the HTTP request transmitted in M1417, to the communication apparatus 10.

(Communication Processing)

Communication processing between the communication apparatuses 10 and 20 according to the present exemplary embodiment is described in detail below with reference to the functional configuration illustrated in FIG. 13 and the like.

(Processing Executed when GOAWAY Frame is Transmitted)

Figure 15:
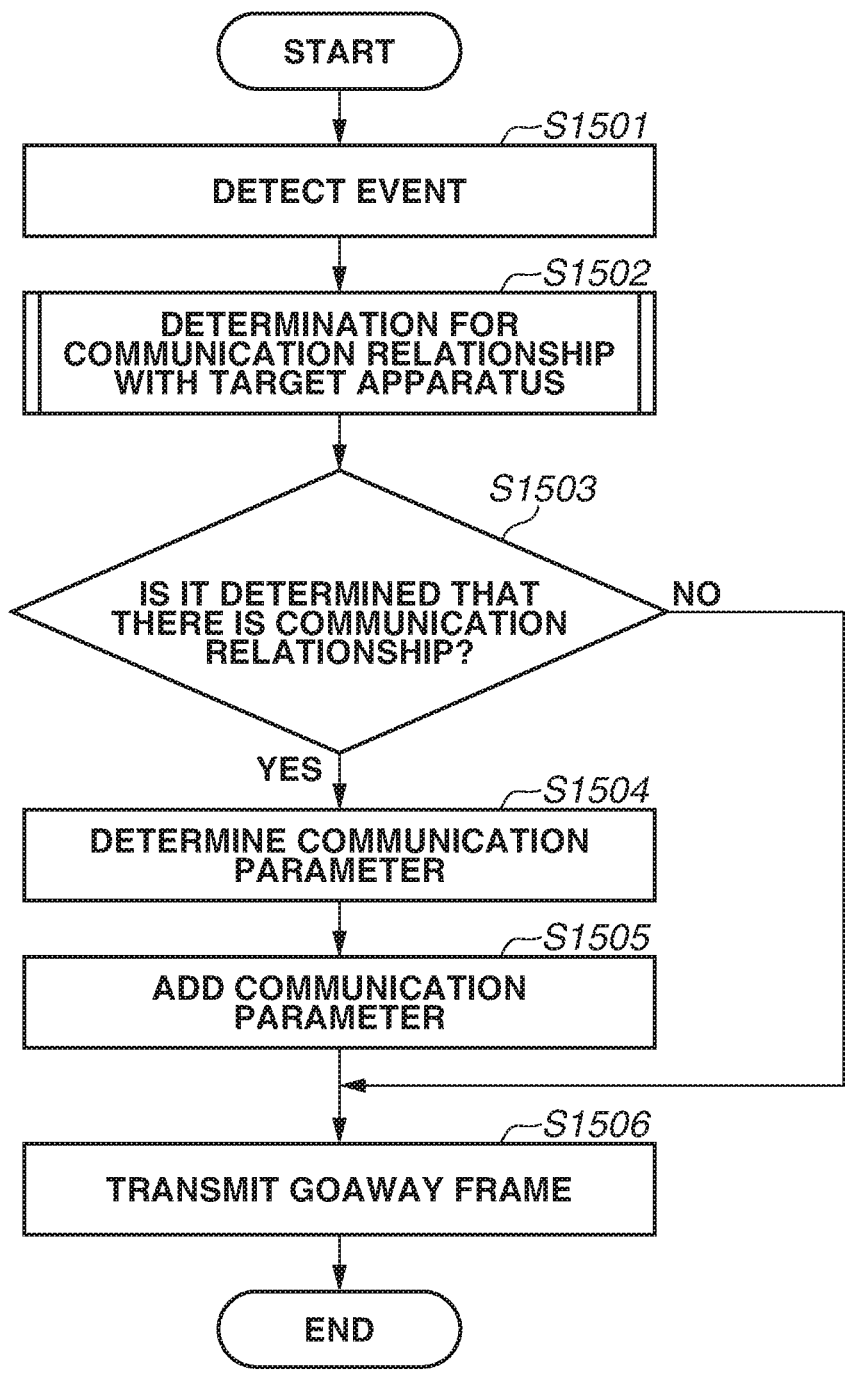
FIG. 15 is a flowchart illustrating an example of processing executed when the GOAWAY frame is transmitted.

FIG. 15 is a flowchart illustrating an example of processing executed by the communication apparatus 20 when the GOAWAY frame is transmitted.

In step S1501, the HTTP communication control unit 1307 detects an event requiring the HTTP communication connection, established with the communication apparatus 10, to be released. In the present exemplary embodiment, the HTTP communication control unit 1307 detects an event that is similar to that in the processing in M1407.

In step S1502, the communication relationship determination unit 1310 determines whether there is the communication relationship with the communication apparatus 10. The processing in step S1502 is described in detail below with reference to FIG. 16.

In step S1503, the processing proceeds to step S1504 when the communication relationship determination unit 1310 has determined that there is the communication relationship in step S1502 (Yes in step S1502), and proceeds to step S1506, when the communication relationship determination unit 1310 has determined that there is no communication relationship in step 31502 (No in step S1502).

In step S1504, the communication parameter determination unit 1308 determines a communication parameter to be added to the GOAWAY frame to be transmitted to the communication apparatus 10. In the present exemplary embodiment, the communication parameter determination unit 1308 determines the communication parameter similar to that in M1409 as the communication parameter to be added to the GOAWAY frame to be transmitted to the communication apparatus 10.

In step S1505, the communication parameter adding unit 309 adds the communication parameter, determined in step S1504, to the GOAWAY frame to be transmitted to the communication apparatus 10.

In step S1506, the HTTP communication control unit 307 transmits the GOAWAY frame to the communication apparatus 10, and the processing in FIG. 15 is terminated.

(Determination Processing for Communication Relationship)

Figure 16:
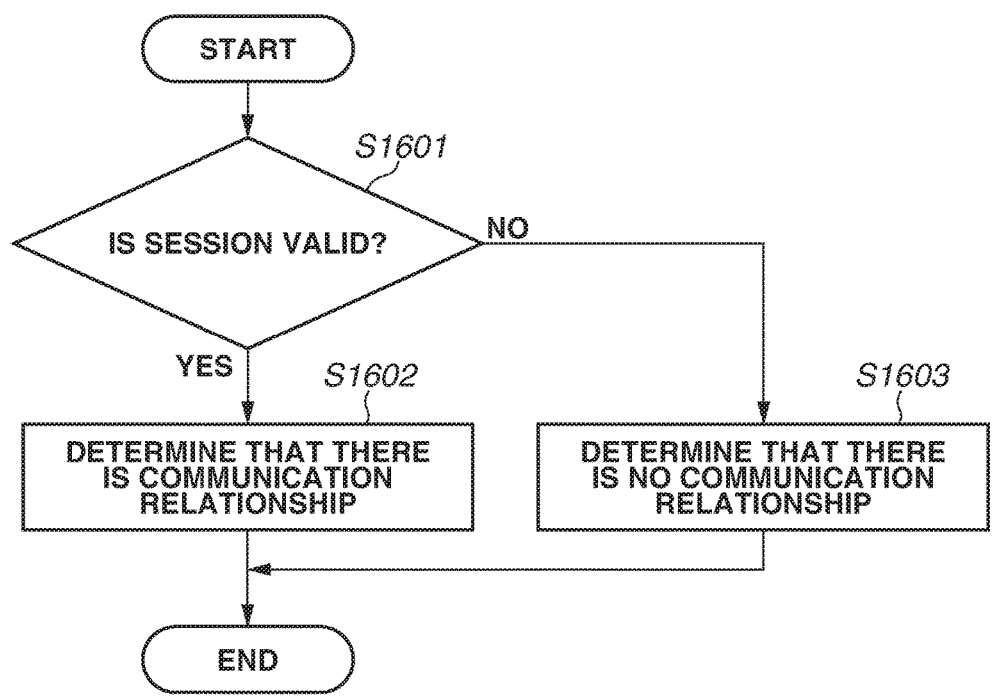
FIG. 16 is a flowchart illustrating an example of processing of determining whether there is a communication relationship.

FIG. 16 is a flowchart illustrating an example of processing, executed by the communication apparatus 20, for determining whether there is the communication relationship. The processing in FIG. 16 represents details of the processing in step 1502.

In S1601, the communication state determination unit 1311 determines whether the session performed with the communication apparatus 10 is still valid. More specifically, the communication state determination unit 1311 determines whether the first session information transmitted to the communication apparatus 10 is valid. When the communication state determination unit 1311 determines that the session performed with the communication apparatus 10 is still valid (Yes in step S1601), the processing proceeds to step S1602. On the other hand, when the communication state determination unit 1311 determines that the session performed with communication apparatus 10 is no longer valid (No in step S1601), the processing proceeds to step S1603.

In step S1602, the communication relationship determination unit 1310 determines that there is communication relationship with the communication apparatus 10, based on the result of the determination processing executed by the communication state determination unit 1311 in step S1601, and the processing in FIG. 16 is terminated.

In step S1603, the communication relationship determination unit 1310 determines that there is no communication relationship with the communication apparatus 10, based on the result of the determination processing executed by the communication state determination unit 1311 in step S1601, and the processing in FIG. 16 is terminated.

In the present exemplary embodiment described above, the communication apparatus 10 can omit the session start request processing, when connection is reestablished with the communication apparatus 20, with the second session information added to the GOAWAY frame by the communication apparatus 20. Thus, the faster connection processing between the communication apparatuses 10 and 20 can be achieved.

In the present exemplary embodiment, the communication relationship determination unit 1310 determines whether there is the communication relationship, based on the result of determining whether the session information transmitted to and from the communication apparatus 10 is valid. Alternatively, the communication relationship determination unit 1310 may determine whether there is the communication relationship, through the method described above in the description of the communication relationship determination unit 1310 in FIG. 13. In such a case, the communication relationship determination unit 1310 can more accurately determine whether there is the communication relationship between the communication apparatuses 10 and 20. Thus, an unnecessary communication parameter can be prevented from being transmitted, and the security risk can be reduced.

The communication apparatus 20 may use information used for header compression, as the communication parameter to be added to the GOAWAY frame. More specifically, the communication apparatus 20 may use information such as a header list as well as a table for header compression including an index table, a static table, and a header table. For example, the communication parameter determination unit 1308 determines to select a table for header compression currently used for the HTTP communications with the communication apparatus 10 as the communication parameter to be added, when the HTTP communication control unit 1307 detects an event requiring the HTTP communication connection, established with the communication apparatus 10, to be released, and the communication relationship determination unit 1310 determines that the communication relationship is to be maintained.

Thus, the communication parameter adding unit 1309 adds information on the table for header compression to the additional debug information in the GOAWAY frame. The communication parameter adding unit 1309 can add all of or a part of the tables for header compression to the additional debug information in the GOAWAY frame. For example, the communication parameter adding unit 1309 may add only a table for header compression mainly generated on the side of the communication apparatus 20 to the additional debug information in the GOAWAY frame. In such a case, the communication apparatus 10 reuses the table for the received header compression when the connection with the communication apparatus 20 is reestablished, so that the header compression can be efficiently performed immediately after the connection is reestablished, whereby even faster communication connection processing can be achieved between the communication apparatuses 10 and 20.

With the configuration according to the present exemplary embodiment, communications for reestablishing a communication path can be completed in a shorter period of time.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-095654, filed May 8, 2015, which is hereby incorporated by reference herein in its entirety.

What is claimed is:

1. A communication apparatus comprising:
a hardware processor; and
a memory storing one or more programs configured to be executed by the hardware processor, the one or more programs including instructions for:
establishing a HTTP-connection;
establishing one or more HTTP-streams based on the HTTP-connection;
detecting, based on a first communication parameter received from another communication apparatus using the one or more HTTP-streams, an error of a predetermined type;
adding to a message that is to be transmitted to said another communication apparatus in accordance with the detection of the error of the predetermined type and is used for shutting down the HTTP-connection, a second communication parameter that is different from the first communication parameter received from said another communication apparatus;
transmitting, to said another communication apparatus, the message including the second communication parameter; and
re-establishing the HTTP-connection using the second communication parameter in a case where the communication apparatus receives the second communication parameter from said another communication apparatus.

2. The communication apparatus according to claim 1, wherein the error of the predetermined type is detected when the first communication parameter is a value that does not conform to a scheme of the communication with said another communication apparatus or an unacceptable value, and
wherein when the error of the predetermined type is detected, a value conforming to the scheme of the communication with said another communication unit or an acceptable value is added, as the second communication parameter.

3. The communication apparatus according to claim 1, wherein, the second communication parameter corresponding to a reliability of said another communication apparatus is added to the message.

4. The communication apparatus according to claim 3, wherein the second communication parameter including security/privacy information is added to the message when the reliability of said another communication apparatus is equal to or higher than a set threshold, and the second communication parameter including no security/privacy information is added to the message when the reliability of said another communication apparatus is lower than the set threshold.

5. The communication apparatus according to claim 1, the one or more programs further including instructions for judging whether the communication with said another communication apparatus is to be maintained,
wherein when it is judged that the communication with said another communication apparatus is to be maintained, information used for re-establishing the HTTP-connection is added to the message as the second communication parameter.

6. The communication apparatus according to claim 5, wherein when it is judged that the communication with said the another communication apparatus is to be maintained, session information between the communication apparatus and said another communication apparatus is added to the message, as the second communication parameter.

7. The communication apparatus according to claim 5, wherein the judgment is performed based on at least one of communication state information, communication history information, and communication scheme information, and
wherein the second communication parameter is added to the message when it is judged that the communication with the another communication apparatus is to be maintained.

8. The communication apparatus according to claim 1, wherein the message is a GOAWAY frame and the second communication parameter conforming to an HTTP communication with said another communication apparatus is added to the GOAWAY frame.

9. A communication system comprising a plurality of communication apparatuses, wherein a first communication apparatus out of the communication apparatuses comprises:
a hardware processor; and
a memory storing one or more programs configured to be executed by the hardware processor, the one or more programs including instructions for:
establishing a HTTP-connection;
establishing one or more HTTP streams based on the HTTP-connection;
detecting, based on a first communication parameter received from a second communication apparatus out of the communication apparatuses using the one or more HTTP-streams, an error of a predetermined type;
adding to a message that is to be transmitted to said second communication apparatus in accordance with the detection of the error of the predetermined type and is used for shutting down the HTTP-connection, a second communication parameter that is different from the first communication parameter received from said second communication apparatus;
transmitting, to said second communication apparatus, the message including the second communication parameter; and
re-establishing the HTTP-connection using the second communication parameter in a case where the communication apparatus receives the second communication parameter from said second communication apparatus.

10. A control method for controlling a communication apparatus, the control method comprising:
establishing a HTTP-connection;
establishing one or more HTTP-streams based on the HTTP-connection;
detecting, based on a first communication parameter received from another communication apparatus using the one or more HTTP-streams, an error of a predetermined type;
adding to a message that is to be transmitted to said another communication apparatus in accordance with the detection of the error of the predetermined type and is used for shutting down the HTTP-connection, a second communication parameter that is different from the first communication parameter received from said another communication apparatus;

transmitting, to said another communication apparatus, the message including the second communication parameter; and re-establishing the HTTP-connection using the second communication parameter in a case where the communication apparatus receives the second communication parameter from said another communication apparatus.

11. A non-transitory computer-readable storage medium storing a program for causing a computer to execute a control method, the computer being configured to control a communication apparatus, the control method comprising:

establishing a HTTP-connection;

establishing one or more HTTP-streams based on the HTTP-connection;

detecting, based on a first communication parameter received from another communication apparatus using the one or more HTTP-streams, an error of a predetermined type;

adding to a message that is to be transmitted to said another communication apparatus in accordance with the detection of the error of the predetermined type and is used for shutting down the HTTP-connection, a second communication parameter that is different from the first communication parameter received from said another communication apparatus;

transmitting, to said another communication apparatus, the message including the second communication parameter; and re-establishing the HTTP-connection using the second communication parameter in a case where the communication apparatus receives the second communication parameter from said another communication apparatus.

12. The communication apparatus according to claim 1, wherein the communication unit is configured to, in response to receive a protocol upgrade signal from said another communication apparatus, change a communication protocol to be used to communicate with said another communication apparatus from a first communication protocol to a second communication protocol, and wherein the detection unit detects the error of the predetermined type based on the first communication parameter of the second communication protocol, and the detection unit does not detect the error of the predetermined type while the communication apparatus and said another communication apparatus communicate using the first communication protocol.

* * * * *